United States Patent
Rizzo et al.

(10) Patent No.: US 9,965,653 B2
(45) Date of Patent: *May 8, 2018

(54) TRUSTED COMPUTING

(71) Applicant: GOOGLE LLC, Mountain View, CA (US)

(72) Inventors: Dominic Rizzo, Mountain View, CA (US); Peiter Zatko, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/389,436

(22) Filed: Dec. 22, 2016

(65) Prior Publication Data

US 2017/0103234 A1    Apr. 13, 2017

Related U.S. Application Data

(63) Continuation of application No. 14/587,551, filed on Dec. 31, 2014, now Pat. No. 9,569,638.

(51) Int. Cl.
*G06F 21/71* (2013.01)
*H04L 12/24* (2006.01)
(Continued)

(52) U.S. Cl.
CPC ............. *G06F 21/71* (2013.01); *G06F 21/31* (2013.01); *G06F 21/35* (2013.01);
(Continued)

(58) Field of Classification Search
CPC ................................ H04L 12/24; G06F 21/00
(Continued)

(56) References Cited

U.S. PATENT DOCUMENTS 8,452,734 B2    5/2013  Munegowda et al.
8,984,592 B1 *  3/2015  Paczkowski .......... H04W 12/08
                                                   726/26
(Continued)

FOREIGN PATENT DOCUMENTS

EP      2 192 523 A1    6/2010
WO      2016/109154 A1  7/2016
WO      2016/109154 A8  8/2016

OTHER PUBLICATIONS

Cattungal, "U.S. Office Action issued in copending U.S. Appl. No. 14/587,551, filed Dec. 31, 2014", dated Mar. 2, 2016, 21 pages.
(Continued)

*Primary Examiner* — Carl Colin
*Assistant Examiner* — Dereena Cattungal
(74) *Attorney, Agent, or Firm* — Marshall, Gerstein & Borun LLP

(57) ABSTRACT

A trusted computing device (TCD) includes an isolated environment, host interface, secure interface, and program instructions. The environment includes an isolated environment processor (IEP), memory (secure and non-secure partition), and an auxiliary processor (AP). Memory and AP are connected for data communication with the IEP, and communicate with a host only through the IEP. The host interface and each secure interface are connected for data communication with the IEP. The instructions provision TCD for cryptographic operations via a secure interface; present a first file system partition comprising a write file and a read file with file creation/deletion privileges allocated only to the IEP at the host interface via the IEP; present a non-secured file system partition with access to the non-secure partition via the host interface via the IEP; receive, via the write file, requests to perform trusted computing; perform requested
(Continued)

computing using the IEP, secure memory, and AP; and write results to the read file.

20 Claims, 12 Drawing Sheets

(51) Int. Cl.
G06F 21/62 (2013.01)
G06F 21/35 (2013.01)
G06F 21/74 (2013.01)
G06F 21/79 (2013.01)
G06F 21/31 (2013.01)
H04L 29/06 (2006.01)
G06F 3/041 (2006.01)

(52) U.S. Cl.
CPC .......... G06F 21/6218 (2013.01); G06F 21/74 (2013.01); G06F 21/79 (2013.01); H04L 63/0428 (2013.01); *G06F 3/041* (2013.01); *G06F 2221/2103* (2013.01)

(58) Field of Classification Search
USPC .............................................. 726/22; 713/193
See application file for complete search history.

(56) References Cited

U.S. PATENT DOCUMENTS

| 9,021,585 | B1 | 4/2015 | Paczkowski et al. |
| 2008/0244738 | A1 | 10/2008 | Shiozawa et al. |
| 2009/0324237 | A1* | 12/2009 | Pan ........................ H04B 10/40 398/135 |
| 2010/0037235 | A1* | 2/2010 | Larimore ................ G06F 9/455 719/312 |
| 2012/0100214 | A1* | 4/2012 | Segura ................. A61K 9/2077 424/475 |
| 2012/0110214 | A1* | 5/2012 | Hahn .................... G06F 3/0607 710/11 |
| 2012/0331550 | A1* | 12/2012 | Raj ........................ G06F 21/53 726/22 |
| 2014/0006789 | A1 | 1/2014 | Grobman et al. |
| 2014/0115330 | A1* | 4/2014 | Chen ..................... H04L 63/18 713/166 |
| 2014/0189808 | A1* | 7/2014 | Mahaffey .............. H04L 63/083 726/4 |
| 2014/0258736 | A1* | 9/2014 | Merchan ................ G06F 21/62 713/193 |
| 2016/0188909 | A1 | 6/2016 | Zatko et al. |

OTHER PUBLICATIONS

Pozzi, "International Search Report and Written Opinion issued in International Application No. PCT/US2015/065128", dated Mar. 8, 2016, 12 pages.

SD Association, "Activating New Mobile Services and Business Models with smartSD Memory cards", Nov. 30, 2014, 20 pages.

Wittmann-Regis, "International Preliminary Report on Patentability issued in International Application No. PCT/US2015/065128", dated Jul. 13, 2017, 9 pages.

* cited by examiner

TRUSTED COMPUTING

CROSS REFERENCE TO RELATED APPLICATIONS

This application is a continuation of U.S. patent application Ser. No. 14/587,551, filed Dec. 31, 2014, and entitled "Trusted Computing." The entire contents of the above-identified priority application are hereby fully incorporated herein by reference.

TECHNICAL FIELD

The present disclosure relates to trusted computing, securing private user information, such as securing user information for host computer interactions, securing communications between users, and establishing a secure system event log to manage event log entries associated with the host computer.

BACKGROUND

Due to a number of factors outside the control of computer users and manufactures, conventional computer systems—including mobile computing systems—are notoriously hostile to private data ownership. For example, any computing device connected to a network may possess vulnerabilities that allow unauthorized individuals to gain access to a user's private information. An unauthorized individual, for example, may exploit a computer system's vulnerabilities to steal, change, or destroy information, often by installing dangerous malware without the owner's knowledge. The computer's owner is then at risk for a variety of dishonest activities, including identity theft and financial loss. Likewise, if an unauthorized individual accesses a user's mobile device, the unauthorized individual may intercept communications of the user. The unauthorized individual can then use the content of the intercepted conversations—without the user's knowledge—to defraud the user or others.

In some instances, an unauthorized individual may attempt to remove evidence of the unauthorized individual's intrusion. For example, if the unauthorized individual has installed malware on a user's computing system, a system event log associated with the user's computer system may create an event log entry for the installation. A savvy, unauthorized individual, however, may be able to delete or alter the system event log entry associated with the user's computer system, thus removing evidence of the unauthorized individual's intrusion. Hence, in some instances, the unauthorized individual covers his or her tracks so that even sophisticated users remain unaware of the unauthorized individual's intrusion. As such, and because of the several vulnerabilities associated with conventional computing systems, conventional computing systems are generally viewed as hostile and untrustworthy hosts of a user's private information.

SUMMARY

In certain example aspects described herein, a trusted computing device is provided. For example, in some embodiments, a trusted computing device is a microSD form factor device that includes an isolated environment, a microSD host interface, a secure interface, a computer program product for trusted computing, and optional out-of-band communications channels that bypass the host system. The isolated environment includes an isolated environment processor, memory, and an auxiliary processor.

The memory is either entirely allocated to a secure partition, or divided into a secure partition and a non-secure partition, and is connected for data communication with the isolated environment processor. The auxiliary processor is connected for data communications to the isolated environment processor and the memory. Both of the memory and the auxiliary processor are in data communication with a host only through the isolated environment processor. Both the host interface and the secure interface are connected for data communication to the isolated environment processor.

The computer program product includes non-transitory computer-readable media having computer-executable program instructions embodied thereon. The instructions, when executed by the trusted computing device, cause the trusted computing device to perform trusted computing. In particular the computer program product includes program instructions to provision the trusted computing device for cryptographic operations via the secure interface. Additional program instructions cause the trusted computing device to present a first File Allocation Table (FAT) file system partition at the host interface via the isolated environment processor. The first FAT file system partition includes a host write file and a host read file. If not configured for secure partition only, further program instructions cause the trusted computing device to present an non-secured second FAT file system partition with access to the memory non-secured partition at the host interface via the isolated environment processor.

Program instructions of the trusted computing device computer program product cause the trusted computing device to receive, via the host write file, requests to perform trusted computing in the isolated environment. The trusted computing includes one or more of: random number generation, append-only logging, monotonic counting, streaming encryption and decryption, bulk encryption and decryption, access to cryptographic primitives, and isolated storage. Further program instructions cause the trusted computing device to perform the requested trusted computing using at least one of the isolated environment processor, the memory secure partition and the auxiliary processor, and then write the trusted computing results to the host read file.

In certain example aspects described herein, a computer-implemented method for secure host interaction is provided. For example, a trusted computing device that is associated with a host computing device receives restricted information. The trusted computing device is preconfigured, for example, to include an isolated environment and a host interface, the host interface including a write file and a read file. The isolated environment, for example, is not directly accessible to the host computing device. The trusted computing device stores the received restricted information, for example, in a secure storage of the isolated environment.

After receiving the restricted information, the write file of the trusted computing device receives a write-file entry from the host computing device. The write file entry, for example, includes an indication of the restricted information that is responsive to the write-file entry. The trusted computing device then processes the write-file entry in the isolated environment of the trusted computing device. To process the write-file entry, the trusted computing device identifies—based on the indication of the restricted information that is responsive to the write-file entry—at least a portion of the restricted information that is responsive to the write-file entry. The trusted computing device then generates an output, such as a secure output, to the read file of the trusted computing device. The generated output, such as a generated secure output, is then available to the host computing device in the read file of the trusted computing device.

In certain example aspects described herein, also provided is a method for secure communication, such as communication between two or more host computing devices. For example, a first trusted computing device associated with a first host computing device receives a first communication from a first user. A secure interface receives the first communication, the first secure interface being isolated from a host interface of the first trusted computing device. For example, the secure interface is associated with an isolated environment that isolates the secure interface.

After receiving the first communication, the first trusted computing device encrypts the first communication in the first isolated environment of the first trusted computing device. The first isolated environment, for example, is not directly accessible to the first host device. The first trusted computing device then transmits the encrypted first communication to a first read file of the host interface of the first trusted computing device. The encrypted first communication is then available to the first host computing device in the first read file of the first trusted computing device. The first host computing device then transmits the encrypted first communication to a second host computing device, the second host computing device being separate from the first host computing device.

Following transmission of the encrypted first communication to the second host computing device, a second trusted computing device associated with the second host computing device receives the encrypted first communication. The second host computing device, for example, transmits the encrypted first communication to the second trusted computing device associated with the second host computing device, and a write file of a host interface of the second trusted computing device receives the encrypted first communication. The second trusted computing device decrypts the encrypted first communication of the first user in a second isolated environment of the second trusted computing device, the second isolated environment being not directly accessible to the second host device.

After decrypting the encrypted first communication, the second trusted computing device transmits the decrypted first communication to a second user. For example, the second trusted computing device transmits the decrypted first communication to the second user via a second secure interface of the second trusted computing device, the second secure interface being isolated from the host interface of the second trusted computing device. The second user then receives the decrypted first communication.

In certain example aspects described herein, also provided is a method for secure event log management. For example, a trusted computing device associated with a host computing device receives a write-file entry into a write file of a host computing device interface of the trusted computing device. In response to receiving the write-file entry, the trusted computing device determines log data associated with the write-file entry. Based on the determined log data, the trusted computing device establishes—in an isolated environment of the trusted computing device that is not directly accessible to the host computing device an event log entry. The trusted computing device then records the event log entry in a secure storage of the isolated environment. If an authorized user requests access to the event log entry, for example, the trusted computing device provides the event log entry to the user, either via a secure interface or via a read file of the trusted computing device.

In certain example aspects described herein, before generating an output to the read file, such as an encrypted communication, an event log entry, or other output such as a secure output, the trusted computing device transmits a request to the user via a secure interface of the trusted computing device to authorize processing of the write-file entry. In response to the request for the user to authorize the processing of the write-file entry, the trusted computing device receives a user input into the secure interface of the trusted computing device. The user input, for example, operates as an authorization for the trusted computing device to process the write-file entry. The trusted computing device thus processes the write-file entry.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
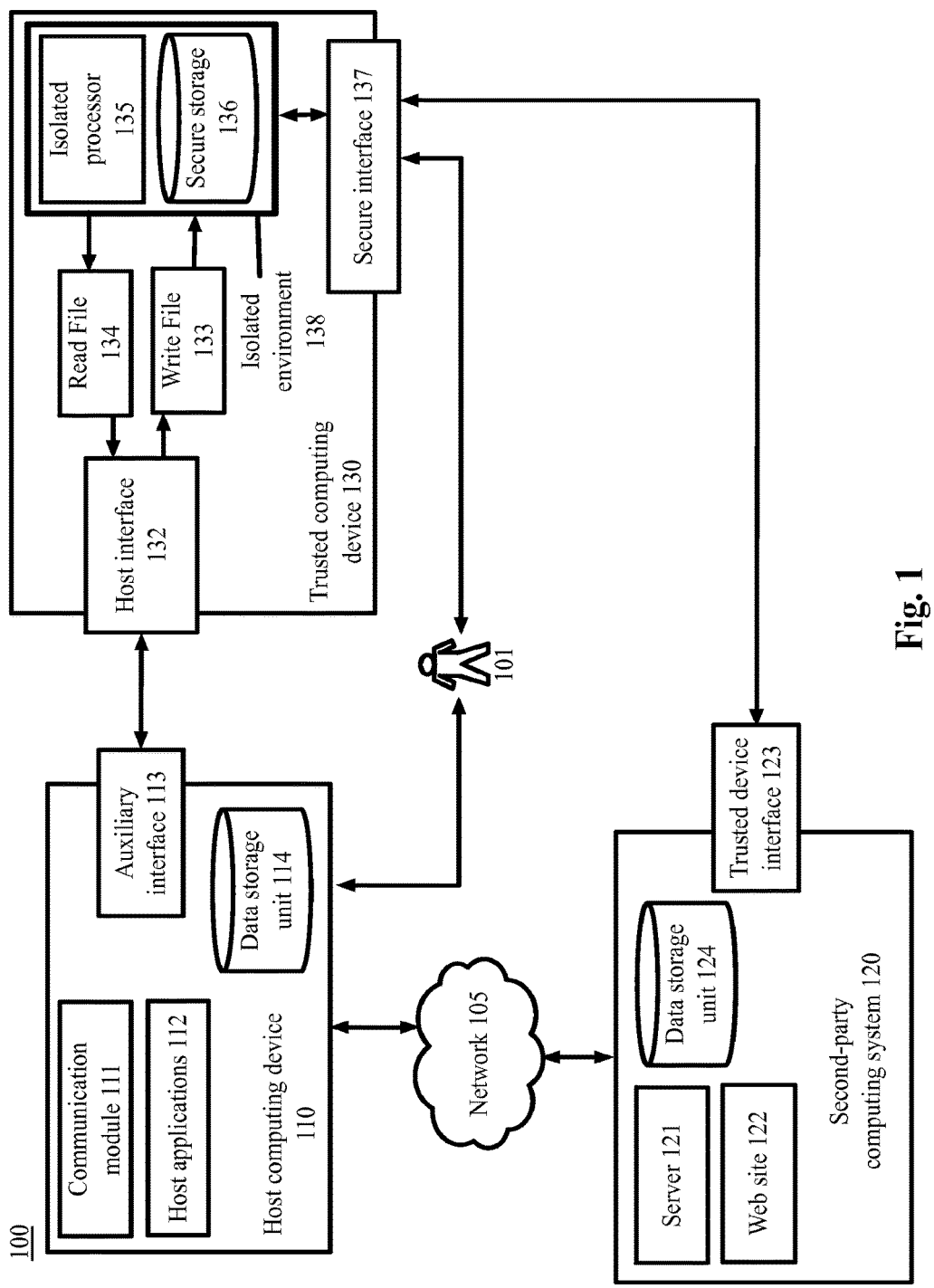
FIG. 1 is a block diagram depicting a system 100 for secure storage and management of restricted information, in accordance with certain example embodiments.

As disclosed herein, a trusted device secures information in an isolated environment, thus isolating the information from an untrusted host device associated with the trusted computing device. For example, the trusted computing device stores restricted information, such as private user information, cryptographic data, or event log entries of the host, in a secure storage of the isolated environment. An isolated environment processor in the isolated environment then allows the trusted computing device to function as a gatekeeper of the private information. For example, the trusted computing device receives a request pertaining to the restricted information and generates a secure output that is available to the host device for additional processing. In certain examples, the trusted computing device encrypts user communications using the stored restricted information. A second trusted device then decrypts the communication using similarly stored restricted information and provides the communication to a second user. In other examples, the trusted device stores event log entries in a secure storage of the trusted device so that the log entries cannot be modified. The trusted device then provides the event log entries to an authorized user.

In some embodiments, the trusted computing device is a microSD form factor device that includes an isolated environment, a microSD host interface, a secure interface, and a computer program product for trusted computing. The isolated environment includes an isolated environment processor, memory, and an auxiliary processor.

The memory is divided into a secure partition and a non-secure partition, and is connected for data communication with the isolated environment processor. The auxiliary processor is connected for data communications to the isolated environment processor and the memory. Both of the memory and the auxiliary processor are in data communication with a host only through the isolated environment processor. Both the host interface and the secure interface are connected for data communication to the isolated environment processor.

The computer program product includes non-transitory computer-readable media having computer-executable program instructions embodied thereon. The instructions, when executed by the trusted computing device, cause the trusted computing device to perform trusted computing. In particular the computer program product includes instructions to provision the trusted computing device for cryptographic operations via the secure interface. Additional program instructions cause the trusted computing device to present a first File Allocation Table (FAT) file system partition at the host interface via the isolated environment processor. The first FAT file system partition includes a host write file and a host read-only file. Further program instructions cause the trusted computing device to present an non-secured second FAT file system partition with access to the memory non-secured partition at the host interface via the isolated environment processor.

Program instructions of the trusted computing device computer program product cause the trusted computing device to receive, via the host write file, requests to perform trusted computing in the isolated environment. The trusted computing includes one or more of: random number generation, append-only logging, monotonic counting, streaming encryption and decryption, bulk encryption and decryption, access to cryptographic primitives, and isolated storage. Further program instructions cause the trusted computing device to perform the requested trusted computing using at least one of the isolated environment processor, the memory secure partition and the auxiliary processor, and then write the trusted computing results to the host read file.

Also disclosed are systems and methods for using the trusted device. In certain examples, the trusted device receives restricted information from a trusted source, such as a trusted second-party computing system. The restricted information can be any type of private information, such as confidential information of the user, confidential information of the second-party computing system, and/or cryptographic data needed to encrypt/decrypt confidential data transmissions. A user's bank, for example, may provision the trusted device by installing the user's private banking account information on the trusted device via the secure interface of the trusted device. The bank may also transmit cryptographic data to the trusted device via the secure interface. The trusted device receives the restricted information, such as the user's bank account information and cryptographic data, and stores the restricted information in a secure storage of the trusted device.

After the second-party computing system provisions the trusted device, for example, the user connects the trusted device to an untrusted host device, such as the user's home computer or mobile phone. The trusted device and the untrusted host can then interact to utilize the restricted information on the trusted device without disclosing the restricted information to the untrusted host. For example, the user may use the untrusted host device and the trusted device to complete a financial transaction, such as a money transfer or withdrawal using the user's bank account information. The untrusted host device, for example, may communicate the amount of the money transfer to the write-file of the trusted device, along with a request to complete the transaction. The isolated environment receives the write-file entry, which includes the transfer amount and the transfer request.

Once the isolated environment of the trusted device receives the write-file entry, an isolated processor within the isolated environment processes the write-file entry, such as by reading the content of the write-file entry and identifying restricted information that is responsive to the content of the write-file entry. For example, if the restricted information includes banking information of the user, the trusted device may use the banking information to process the money transfer or withdrawal. The isolated processor, for example, can retrieve the user's private financial account information from the secure storage of the trusted device and generate an output to the read-file authorizing the money transfer—all in the isolated environment. The isolated environment, for example, is not directly accessible to the host device. Instead, the host device indirectly accesses the isolated environment through a host interface that includes a read file and a write file. In certain examples, before generating the output the trusted computing device can secure the output, such as by using any previously receives cryptographic data. The secure output may include, for example, the encrypted account information of the user and an encrypted transfer authorization.

After transmission of the secure output to the read file of the trusted device, the untrusted host device can retrieve the secure output and complete any further processing related to the secure output. For example, if the secure output includes encrypted account information of the user and an encrypted transfer authorization, the untrusted may retrieve the secure output from the read file of the trusted device. The untrusted host device can then process the secure output by routing the secure output to a communication application, which then transmits to the secure output to the user's bank. The bank can then decrypt the secure output and thereafter complete the money transfer or withdrawal for the user.

In certain examples, two or more trusted devices may be used to provide secure communications between multiple users. For example, the trusted device may be attached to or integrated into a user headset that is connected to an untrusted host device, such as the user's phone. Two users can pair the two trusted devices of the headsets together, so that each trusted device of the pair receives corresponding cryptographic data. Each trusted computer device can then store the cryptographic data, such as corresponding crypto keys, in the secure storage of the trusted device. Additionally or alternatively, in certain examples a second-party computing system may provision the trusted devices with the cryptographic data by providing the cryptographic data to the trusted device pair via the secure interface of each trusted device.

Once two devices are paired, for example, a first user in one location can securely communicate with a second user in a different location. For example, the first user provides a communication into the secure interface of the trusted device, such as by speaking into a microphone of a headset associated with the trusted device. The isolated environment then receives the user's communication via the secure interface. A processor in the isolated environment encrypts the communication, and then transmits the communication, as a secure output, to the read file of the trusted device. An untrusted host device associated with the trusted device, such as the first user's mobile phone, can then receive the encrypted communication from the read file of the trusted device. For example, if the trusted device is attached to or integrated into a headset, the headset may wirelessly transmit the encrypted communication to the first user's mobile phone (the untrusted device in this example). The first user's mobile phone can then transmit the encrypted communication to a second untrusted host device, such as a mobile phone of the second user, via a network.

After receiving the encrypted communication, the second untrusted host device writes the encrypted communication to the write file of a second trusted device associated with a second user. For example, the second user's mobile device may receive the encrypted communication via a network and then wirelessly transmit the encrypted communication to the write file of a second trusted device that is attached to or integrated into a headset of the second user. The isolated environment receives the encrypted communication from the write file, and an isolated processor within the isolated environment decrypts the encrypted communication. For example, the processor retrieves the cryptographic data from the secure storage of the isolated environment and then relies on the cryptographic data to decrypt the communication. The trusted device then provides the decrypted communication to the second user via a secure interface of the second trusted device. For example, the second trusted device provides the decrypted communication directly to the user via speaker that is connected to the secure interface of the second trusted device. The second user then receives the decrypted communication. During such communications, at no time is the decrypted communication, or cryptographic keying material, accessible to an untrusted host device.

In certain examples, such as in a two-way or bidirectional communication between two users, the second user may provide a secure communication to the first user by reversing the secure communication method described herein. For example, the second user may speak into a microphone that is associated with the secure interface of the second trusted device. The second trusted device receives the communication via the secure interface, and a processor of the isolated environment encrypts the communication of the second user. The processor then transmits the encrypted communication to a read file of the second trusted device. The second user's mobile phone, as the untrusted host device, receives the encrypted communication and transmits the encrypted communication to the first untrusted host device, such as the mobile phone of the first user. The first untrusted host device transmits the encrypted communication to a write file of the untrusted host device associated with the first untrusted host, and a processor in the isolated environment decrypts the communication using the cryptographic data. The trusted device then provides the decrypted communication from the second user to the first user via the secure interface of the first trusted device.

In addition to the above methods and systems, also provided herein is a method and system for establishing a secure system log. For example, a user may wish to use the trusted device to record system log event entries of the user's host device, such as attempts to access and/or use the user's device. Additionally or alternatively, the user may wish to use the trusted device to record attempts by others to access and/or use the restricted information. As such, the user may authorize the trusted device to monitor and record activity associated with the trusted device, such as by connecting the trusted device to the user's computing device.

Once connected to the host device, the trusted device can securely receive and store system log event entries in the secure storage of the isolated environment of the trusted device. For example, every time the host device transmits a request to a write file of the trusted device, the isolated processor of the trusted device determines log data for the write-file entry. The processor then records an event log entry for the write-file entry in the secure storage of the trusted device.

After the log data is recorded in the secure storage of the isolated environment, an untrusted host device cannot access, tamper with, delete, or otherwise alter the stored log data. An attacker, for example, cannot access the stored log data via the untrusted host—or the trusted device—as an attacker would not be authorized to access the secure interface of the trusted device. Instead, only an authorized user can access the stored log data. For example, the user may request the event log entry via the secure interface of the trusted device. The trusted device then provides the event log entry to the user via the secure interface, and the user receives the event log entry via the secure interface. Yet at no point is an attacker, or authorized user, permitted to modify or otherwise alter the log data recorded to secure storage.

Additionally or alternatively, the user may receive the event log entry using a different host device. For example, the user may remove the trusted device from the host device, and then connect the trusted device to a different host device. The user can then request the event log entry from the trusted device, such as by directing the second host device to create a write-file entry requesting the event log entry. The trusted computing device receives the request, and then processes the request to generate an output in a read file of the trusted computing device—the output including the event log entry. The second host device then receives the output from the read file, and provides the output to the user. The user then vies the output and hence the event log information, such as via a user interface of the second host device.

In certain examples, the methods and systems described herein may rely on a user input into the trusted computer device, such as a "proof of life" and/or identity confirmation, before processing the restricted information and/or transmitting the secure output to the read file. For example, before transmitting the secure output to the read file of the trusted device, the trusted device may notify the user that a user input is needed, such as by providing a blinking light, chime, or other communication to the user. The user can then respond to the user input request from the trusted device via the secure interface of the trusted device, such as by touching a secure sensor associated with the secure interface of the trusted device.

Additionally or alternatively, the user may provide a user security code to the trusted device via the secure interface, such as by directly inputting the code into the body of the trusted device and/or into a separate computing device that is securely connected to the trusted device via the secure interface. For example, the trusted device may require such "proof of life" and/or identity confirmation of the user before transmitting an encrypted money transfer or withdrawal authorization to the read file of the trusted device. Additionally or alternatively, the trusted device may require such "proof of life" and/or identity confirmation before providing access through the secure interface. In certain examples, such "proof of life" and/or identity confirmation may be required before information is communicated through a secure interface. For example, the trusted device may require "proof of life" and/or identity confirmation before transmitting secure information to a user via the secure interface, such as before transmitting system log event entries from the secure storage to a user.

By securing private information in an isolated environment that is not directly accessible to an untrusted host device, the devices, systems, and methods described herein protect users from the vulnerabilities associated with the user's computing devices. For example, the devices, systems, and methods described herein allow a user to securely use restricted information to complete activities—such as money transfers, withdrawals, or other banking activities—that would otherwise expose the user's restricted information to an untrusted (and non-secure) host computing device. The devices, systems, and method described herein also allow users to privately communicate without ever exposing the content of their communications to an untrusted (and non-secure) host computing device. Further, by providing a method for secure event log management, the devices, systems, and methods described herein prevent hackers or others with a malicious intent from covering their tracks.

Example System Architectures

Turning now to the drawings, in which like numerals indicate like (but not necessarily identical) elements throughout the figures, example embodiments are described in detail.

FIG. 1 is a block diagram depicting a system 100 for secure storage and management of restricted information, in accordance with certain example embodiments.

As depicted in FIG. 1, the system 100 includes network computing devices 110 and 120 that are configured to communicate with one another via one or more networks 105. In some embodiments, a user 101 associated with a device must install an application and/or make a feature selection to obtain the benefits of the techniques described herein. For example, a user 101 may choose to install, turn on, or otherwise activate a service on the on the untrusted host computing device 110, and install application programming interface (API) code on the host computing device 110 to allow the host computing device 110 to use the trusted computing device 130.

In certain example embodiments, the network 105 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, near field communication ("NFC"), Wi-Fi, or any combination thereof or any other appropriate architecture or system that facilitates the communication of signals, data, and/or messages. Throughout the discussion of example embodiments herein, it should be understood that the terms "data" and "information" are used interchangeably herein to refer to text, images, audio, video, or any other form of information that can exist in a computer-based environment.

Each network computing device 110 and 120 includes a device having a communication module capable of transmitting and receiving data over the network 105. For example, each network computing device 110 and 120 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110 and 120 are operated by users 101, host computing device 110 system operators (not shown), or second-party computing system operators 120, respectively.

The user 101 can employ a communication application 111, such as a web browser application (not shown) or a stand-alone application, to view, download, upload, or otherwise access documents or web pages via a distributed network 105. The communication application 111 of the host computing device 110 can interact with web servers or other computing devices connected to the network 105. For example, the communication application 111 can interact with the second-party computing system 120. In certain example embodiments, the communication application may also interact with the trusted computing device 130, such as via the auxiliary interface 113 of the host computing device 110.

In addition to the communication application 111, the host computing device 110 (or "host device") may include a variety of host applications 112, such as an email application, text messaging application, contacts application, or other applications. For example, the host applications 113 may include an application that the user 101 downloads and installs from the user's financial institution, such as an application from the user's bank. The user 101 can then use the banking application, along with the trusted computing device 130 (or "trusted device"), to conduct financial interacts with the user's financial institution as described herein. In certain example embodiments, the host applications 112 may include a digital wallet application. The digital wallet application may encompass any application, hardware, software, or process the user 101 of the host device 110 may employ to assist the user 101 in completing a purchase transaction.

The host device 110 also includes an auxiliary interface 113, which includes one or more ports for connecting the host device 110 to other devices, such as the trusted computing device. In certain example embodiments, the auxiliary interface 113 may include a wireless interface for connecting the host device 110 to other devices. For example, the auxiliary interface 113 may allow connections to other devices, such as the trusted computing device, via Bluetooth, Bluetooth low energy, near field communication ("NFC"), Wi-Fi, or any combination thereof.

The host device 110 also includes a data storage unit 114 that is accessible by the communication application 111 or other host applications 112 of the host device 110. The example data storage unit 114 can include one or more tangible computer-readable media. The data storage unit 114 can be stored on the user computing device 110 or can be logically coupled to the user computing device 110. For example, the data storage unit 114 can include on-board flash memory and/or one or more removable memory cards or removable flash memory.

The second-party computing system 120 (or "second-party system") includes a server 121. The server 121, for example, may represent the computer-implemented system that the second-party computing system 120 employs to provision the trusted device 130, such as described herein. For example, the server 121 may communicate restricted information to the trusted device 130 via a trusted device interface 123 of the second-party system 120 and via a secure interface 137 of the trusted device 130. The trusted device interface 123, for example, represents a trusted port or other trusted connection to the second-party computing system 120. For example, the trusted device interface 123 of the second-party system 120 may include small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, or other connection port.

In certain example embodiments, the second-party system 120 includes a web site 122. The website 122, for example, may allow the user 101 to interact with the second-party system 120. For example, if the second-party system 120 operates as the user's financial institution, the website may allow the user 101 to access financial accounts of the user 101. The website 122 may also provide the user 101 with applications the user 101 can download to the host device 110 of the user 101, such as a banking application and/or digital wallet application affiliated with the second-party system 120.

The second-party system 120 also includes a data storage unit 124. In certain example embodiments, the data storage unit 124 may store private and confidential information associated with a user 101, as described herein. For example, if the second-party system 120 operates as the user's financial institution, the data storage unit 124 may include financial account information of the user 101, such as a checking account number, a savings account number, and/or a credit card number of the user 101.

In certain example embodiments, the data storage unit 124 may include cryptographic data, as described herein. For example, the second-party device 120 may provision the trusted device 130 to include corresponding cryptographic data for encrypting/decrypting communications. In such embodiments, the data storage unit 124 may store compatible cryptographic data for use in decrypting encrypted communication received from the trusted device 130 via the host device 110, as described herein. The sever 121, for example, may process the received encrypted communication, such as by retrieving cryptographic data from the data storage unit 124 and applying the cryptographic data to the encrypted communication.

The exemplary data storage unit 124 of the second-party system 120 can include one or more tangible computer-readable media. The data storage unit 124 can be integrated into the second-party system 120 or can be logically coupled to the second-party system 120. For example, the data storage unit 124 can include on-board flash memory and/or one or more removable memory cards or removable flash memory.

The trusted device 130 includes a host interface 132, such as a port, for interacting with the host device 130. The host interface 132 of the trusted device 130 also includes a write file 133, which operates to receive data from the host device via the host interface 132. The host interface 132 of the trusted computing device 130 also includes an isolated environment 138. The isolated environment 138, for example, includes various components of the trusted device 130 that are not directly accessible to the host device 110. Instead, as described herein, the host device 110 interacts with the components of the isolated environment through the write file 133 and the read file 134. The isolated environment 138 includes, for example, an isolated processor 135 and a secure storage 136. The isolated processor 135, for example, represents the component of the trusted devices 130 that processes write-file entries from the host device 110 or data received via a secure interface 137 of the trusted device 130, as described herein. The secure storage 136, for example, operates to receive and store restricted information, as described herein, such as confidential or private user information, cryptographic data, and/or or secure event log entries. The secure storage 136 also stores computer executable program instructions for execution on the trusted device 130. In some embodiments, the secure interface 137 of the trusted device 130 represents a secure portal into the isolated environment 130 of the trusted device 130, such as for receiving restricted information, as described herein. The host interface 132 of the trusted device 130 also includes a read file 134. The read file 134, for example, operates to receive outputs from the isolated environment 138, such as from the isolated processor 135, as described herein. The host device 110 can then receive the output from the read file 134 via the host interface 132 and the auxiliary interface 113 of the host device 110. The details of the trusted device 130 are described herein below with reference to FIGS. 2 and 3.

Figure 2:
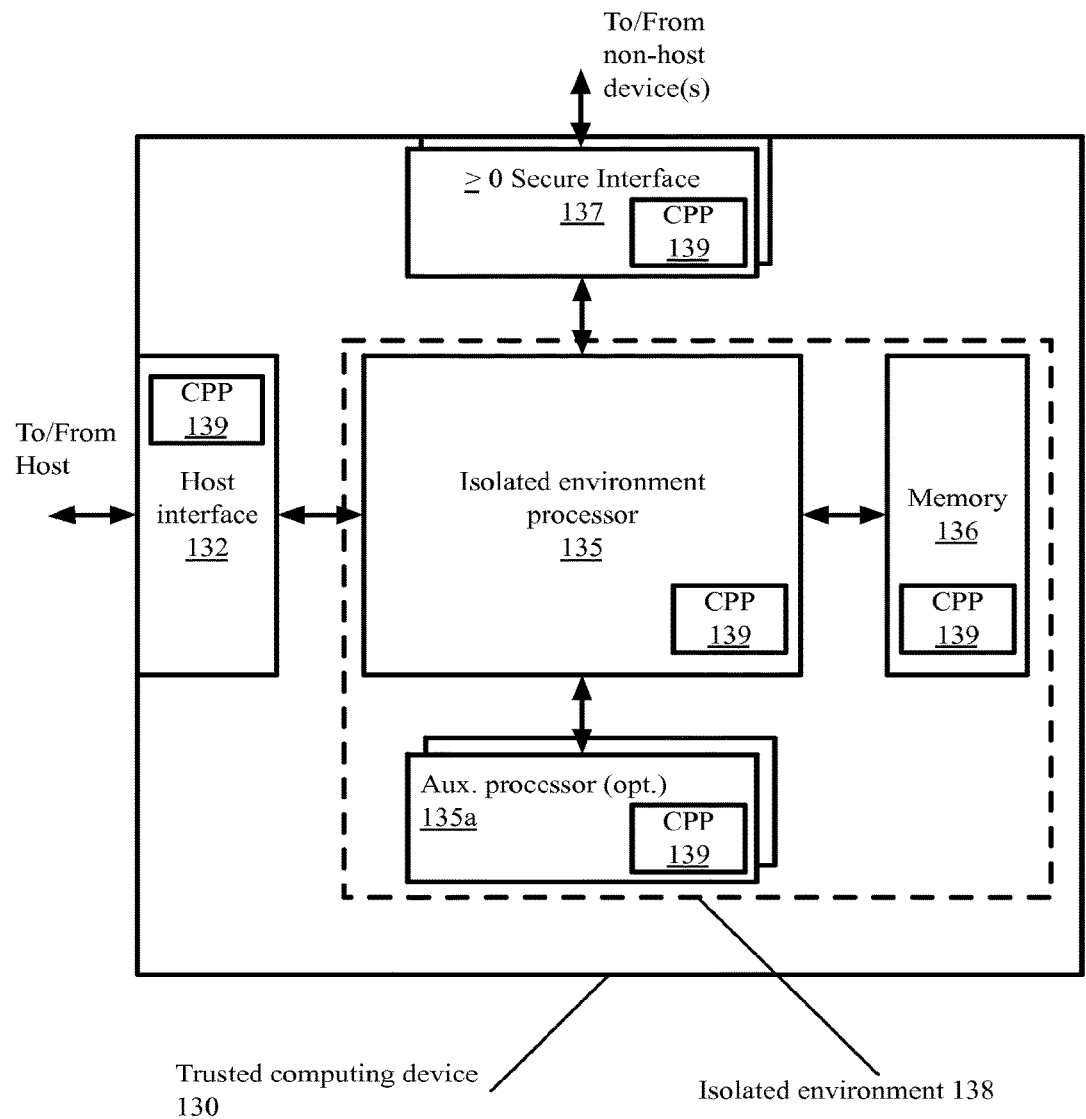
FIG. 2 is a block diagram depicting a trusted computing device, in accordance with certain example embodiments.

Referring to FIG. 2, and continuing to refer to FIG. 1 for context, a block diagram depicting a trusted computing device 130 in accordance with certain example embodiments is shown. In the embodiments depicted by FIG. 2, a trusted computing device 130 includes an isolated environment 138, a host interface 132, zero or more secure interfaces 137, and a computer program product 139 that is distributed across the components of the trusted device 130.

The isolated environment 138 includes an isolated environment processor 135, zero or more auxiliary processors 135a, and memory 136. The memory 136 is connected for data communication with the isolated environment processor 135. In some embodiments, the memory 136 includes both a secure partition and at least one non-secure partition. In some embodiments, the memory 136 includes at least 512 MB of nonvolatile flash memory.

Each auxiliary processor 135a is connected for data communication with the isolated environment processor 135 and the memory 136. While the data communication connection between an auxiliary processor 135a and the memory 136 as shown in FIG. 2 is via the isolated environment processor 135, a direct connection or a bus can serve to connecting the isolated environment processor 135, the auxiliary processor 135a, and the memory 136.

Each auxiliary processor 135a and the memory 136 communicate with the host outside the isolated environment 138 only through the isolated environment processor 135. Each secure interface 137 and the host interface 132 are in data communication with the isolated environment processor 135.

The computer program product 139 includes non-transitory computer-readable media having computer-executable program instructions embodied thereon. When executed by the trusted computing device 130, the program instructions cause the trusted computing device 130 to perform a variety of trusted computing operations. In embodiments that include a secure interface 137, the program instructions cause the trusted computing device 130 to provision itself, such as for cryptographic operations, in cooperation with an external device via the secure interface 137. In some embodiments that do not include a secure interface 137 in production models, the trusted device manufacturer provisions the trusted device 130 using an interface not exposed in the production model. In some embodiments, while trusted device 130 provisioning can be performed via a secure interface 137, provisioned information (such as cryptographic keys) cannot be read from the isolated environment 138.

Using the program instructions of the computer program product 139, the trusted device 130 presents a first file system partition via the host interface 132 from the isolated environment processor 135. The first file system partition comprises a host read file 134 and a host write file 133. In some embodiments, the first file system partition is characterized by file creation and file deletion privileges allocated only to the isolated environment processor 135, and the read file 134 is read-only with respect to a host 110.

In embodiments where the memory 136 includes a non-secure partition, the program instructions, when executed by the trusted device 130, present a non-secured second file system partition with access to the memory 136 non-secure partition at the host interface 132 via the isolated environment processor 135.

Using the program instructions of the computer program product 139, the isolated environment 138 receives requests to perform trusted computing in the isolated environment 138 via the write file 133. The trusted computing operations performed by the trusted device 130 include one or more of: random number generation, append-only logging, monotonic counting, streaming encryption and decryption, bulk encryption and decryption, secure storage, and sealed storage, access to cryptographic primitives, and other operations described elsewhere herein. Under the control of the program instructions of the computer program product 139, the isolated environment 138 performs the requested trusted computing operations using at least one of the isolated environment processor 135, the memory 136 secure partition, and any present auxiliary processors 135a. The isolated environment processor 135, executing program instructions of the computer program product 139, writes the results of the trusted computing performed in the isolated environment 138 to the host read file 134.

The isolated environment processor 135, can be one of many microprocessors or microcontrollers suitable to provide separable interfaces to 1) an untrusted host 110 via the host interface 132, 2) zero or more trusted secure external devices via the zero or more secure interfaces 137, and 3) elements of the isolated environment 130. In some embodiments, the isolated environment processor 135 is a low power micro-controller such as the ARM M3, M4 whereas in other embodiments the processor may be a full featured application processor such as Intel's PENTIUM™ or similar. A substantial portion of the program instructions, such as provisioning the trusted device 130, reading input from the host write file 134, performing less time-sensitive trusted operations such as bulk encryption/decryption, and writing results to the host read file 133, are performed by the isolated environment processor 135 in some embodiments. In some embodiments, one or both of the host interface 132 and each secure interface 137 are integrated into the isolated environment processor 135.

An auxiliary processor 135a can be included in the isolated environment for various reasons, including improving overall trusted device 130 manufacturability. Existing cryptographic processors, especially those performing time-sensitive tasks, often implement some functionality in hardware, for example, cryptographic processors implemented as Application-Specific Integrated Circuits (ASICs). Implementation of system functionality in an ASIC can reduce system costs, save space, allow management power consumption, save manufacturing cost, and result in fewer discrete components (a factor in reliability and maintainability). For example, the isolated environment 138 can include an auxiliary processor 135a to perform streaming encryption for voice and video, a real time task for high bandwidth data, in conjunction with the memory 136 secure partition. Other reasons to include using an auxiliary processor 135a to measure the operation/execution of the main processor 135 in the isolated environment 138. In this way, the auxiliary processor is an attestation processor that states whether the secure environment is operating as expected integrity measurements. In some embodiments, an auxiliary processor 135a includes one or more secure interfaces separate from those controlled by the isolated environment processor 135. As an example, consider an auxiliary processor 135a including a secure NFC interface for "proof of life" or device attestation. In such cases, the isolated environment can be considered extended to a trusted device at the other end of the NFC interface.

In some embodiments of the trusted device 130, a secure interface 137 can be used, in combination with the computer program product 139 and the isolated environment 138, for provisioning the trusted computer device 130, for example, loading keys for cryptographic operations and performing software upgrades. In some such embodiments, the secure interface 137 can be implemented as a Joint Test Action Group (JTAG), I2C, SPI, or other similar interfaces.

In some embodiments of the trusted device 130, a secure interface 137 can be used, in combination with the computer program product 139 and the isolated environment 138, for implementing a challenge-response protocol. In a challenge-response protocol, a "challenge" is presented that requires a valid "response" in order to proceed with a given activity. For example, in a trusted device 130 having a first secure interface 137 including an light emitting diode (LED) visible to a user, and a second secure interface 137 that responds to touch, program instructions of the computer program product 139 can be executed to illuminate the LED, signaling to a user that the user must touch the second secure interface 137 in order to proceed with a given activity of the trusted device 130. In some embodiments, the second secure interface 137 is a capacitive sensor that takes human body capacitance as input. In some embodiments, a resistive touch sensor or a piezoelectric touch sensor is used.

Figure 3:
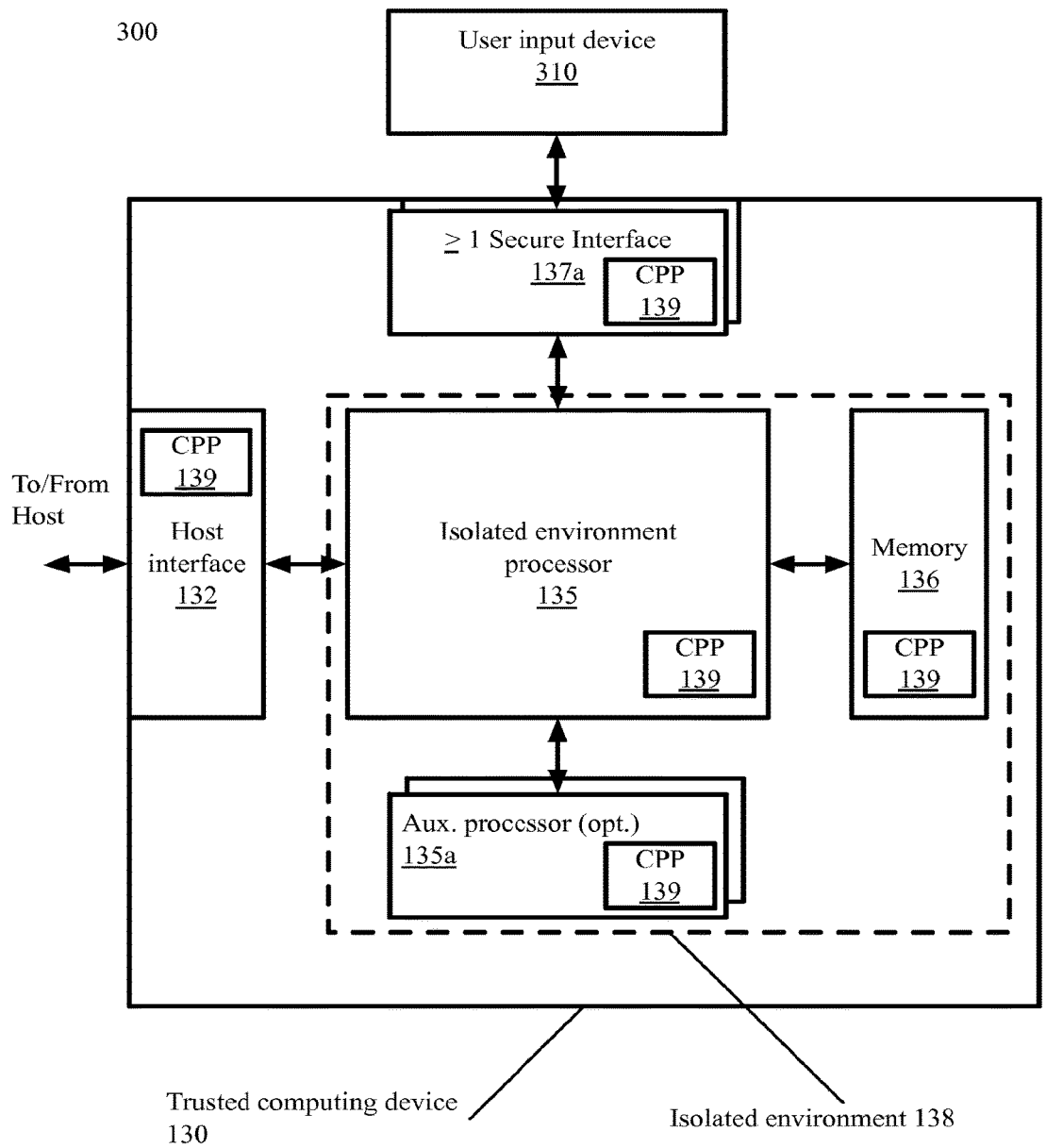
FIG. 3 is a block diagram depicting a system for trusted computing, in accordance with certain example embodiments.

As another example use of a secure interface 137, consider the system of FIG. 3. In addition to the trusted computing device 130 described above in connection with FIG. 2, the system 300 of FIG. 3 includes at least one secure interface 137a and a user interface device 310. The user interface device 310 is in data communication with the isolated environment 138 via the secure interface 137a. Data communication between the user interface device 310 and the trusted device 130 can employ any one or a combination of a variety of connections (preferably wireless), including an Infrared Data Association (IrDA) link, a BLUETOOTH® wireless technology standard link, and a Near Field Communication (NFC) link. The trusted device 130 issues a challenge, such as lighting an LED on the trusted device 130 or sending a message to a display of user interface device 130. The user 101 responds to the challenge using the user interface device 310. In some embodiments, the response is a fingerprint response input to the user interface device 310. In some embodiments, the response is an answer to an authentication question presented on a display of the user interface device 310. In some embodiments, the user interface device 310 can be a mobile communication device such as a mobile phone. In some embodiments, the user interface device 310 can be an NFC-enabled fob.

The trusted device 130 computer program product 139 includes an operating system, the file system interface (which presents the first file system partition along with user mode interfaces to the host 110 at the host interface 132 via the isolated environment processor 135), and various applications. In some embodiments, the trusted device 130 operates in three (3) modes: provisioning, runtime (including a user mode in which requests are received via the file system interface, and results are written to the file system interface), and verification/attestation. In some embodiments, the trusted device 130 communicates through a secure interface (i.e. JTAG) 137 in the provisioning mode. In such embodiments, runtime includes user mode interactions where communications are with the untrusted host via the file system interface. The verification/attestation mode includes communication with the user via a secure interface 137 out-of-band channel such as NFC, irda, etc.

In some embodiments, the operating system (OS) is a 32-bit, preemptively multitasking, interrupt-driven operating system. Applications running on this OS have access to cryptographic primitives as part of cryptographic services that are part of the computer program product 139, as well as access to the non-volatile memory 136 secure partition for storing persistent data as part of user mode services of the OS. Further, the OS provides an API for accepting incoming session requests from a host, and for then using and managing those sessions as part of user mode session services.

In some embodiments, user mode applications running in OS are resource-constrained. Before launching an application, the OS designates regions of memory 136 secure partition for the application's initial stack and heap, both of which can be constrained, for example to a combined 4-6 kilobytes. Applications can be compiled directly into the OS image in such embodiments, so care should be taken to avoid function and type names which conflict with OS and the trusted computing device 130 libraries.

In some embodiments, when the trusted computing device 130 is connected to a host 110, it presents the host operating system with a correctly-formatted and partitioned FAT file system with the following layout: a master boot record (MBR) with a partition table necessary for addressing the a first file system partition and the (optional) memory 136 non-secure second file system partition. The first file system partition contains two files, called "read file" and "write file," which can be read and written to (respectively) by the host 110, and are the only means of host 110—trusted computing device 130 communication. The (optional) memory 136 non-secure second partition provides unprotected non-volatile storage area that can be read or written to by the host 110 operating system.

Note that the first file system partition is not limited to using only two files. If additional communication channels are required for an application, the trusted computing device 130 can present additional files in this partition, each subject to the administrative control of the trusted device 130. In some embodiments, all blocks in the first file system partition that are not used by the device-controlled read files(s) 134 and write file(s) 133 can be marked as "bad." The trusted device 130 controls access to the files in the first file system partition. By presenting a standard FAT file system, the trusted computing device 130 can communicate with a wide range of hosts 110, while requiring a minimum of assumptions on the capabilities of the host 110. Note that in some embodiments, additional files can be used, for example, one or more third files (for reporting errors or alerting the host 110 to specific global states (i.e. NOT RUNNING)—but in each case the interface between the untrusted host 110 and the isolated environment 138.

Also note that the (optional) memory 136 non-secure second partition behaves like a mass storage device, for example, a flash memory device. The trusted computing device 130 passes these interactions in a transparent fashion to the untrusted host 110.

Applications running on the host 110 can access the trusted device 130 first file system partition directly, but for convenience a host-side Portable Operating System Interface (POSIX)-style API is provided in some embodiments. The POSIX-style API includes operations for opening/closing sessions, as well as sending/receiving data.

Modern operating systems have sophisticated file system features that are, unsurprisingly, optimized for use with actual file systems. One example of this is caching, which provides significant benefits for accessing a file system, but which may impede information flow over the trusted computing device 130 first file system interface. To circumvent this behavior in embodiments implementing a POSIX-style API, applications can use "posix_fadvise" to mark the file descriptors with "POSIX_FADV_DONTNEED;" in this way, data input/output to the trusted computing device 130 first file system partition will not be cached by the host 110 operating system. Additionally, when writing to the trusted device 130, the host 110 can call flush data to the file, for example, using "fsync."

The trusted device 130 first file system partition allows applications running on the host 110 to establish a session (a stateful, bi-directional communications channel) with applications running on the trusted computing device. Sessions can follow a client/server model, with peripheral applications acting as the server. Session endpoints, whether clients running on the host 110 or servers running on the trusted computing device 130, can be identified by a hash/end-point number pairing. This pairing can be distilled into a 16-byte universally unique identifier (UUID) value, which can be used within the session management code (on both the host 110 and the trusted device 130) to identify known endpoints.

In some embodiments, when a host 110 application wishes to communicate with a trusted device 130 application, it can: 1) generate an elliptic curve cryptography (ECC) key pair; 2) choose a random end-point number for itself; 3) allocate and initialize a session context structure; 4) register its key hash and end-point number with the session management library; and 5) send a connection request to the trusted device 130 via the first file system partition. The trusted device 130 application is then notified of the inbound connection request. The trusted device 130 then accepts the request or rejects it. If the connection is accepted, the host 130 application may send and receive data via the session. Upon termination of the session, session tear-down procedures common in session-based communication are followed.

In addition to applications described elsewhere herein, embodiments of the trusted device 130 makes a variety of cryptographic primitives available to both applications running on the trusted device 130 and applications running on the host 110. The trusted computing device 130 can provide many of the same application APIs to its isolated environment 138 applications as it does host 110 applications, for example, streaming encryption service, tamper proof logging, and one-time password type authentication algorithms and keys.

In some embodiments, for launching an application in the OS user mode, a system developer is responsible for invoking the OS initialization routine, adding any custom tasks and setting their parameters, and launching the OS. Each task can be configured to include its own isolated heap by specifying a valid size. It may then interact with the heap using a standard dl malloc API. Sessions are the main method of communication in the OS. These can leverage the file system interface in order to define a bi-directional message channel between the task and a remote endpoint. The API can be derivative of a UNIX socket API for datagram socket families, and the semantics can be similar, for example, open/close/sendto/recvfrom. In order to efficiently use CPU cycles, some system interfaces can suspend a given task and allocate CPU time to other operations. In most cases this is done automatically, for example, when a session operation must wait on data. In addition a task can elect to give up its CPU time by issuing a "yield" system call.

To facilitate communications across the file system interface, embodiments of the trusted device 130 provide a set of functions for serializing and de-serializing primitive data types. One purpose of these routines is to ease the process of marshaling data between the host 110 and trusted device 130. The trusted device 130 provides serializing/de-serializing routines for various primitive types: the integral types, strings, and universally unique identifiers (UUIDs). For richer data structures, some embodiments of the trusted computing device provide a code generation utility, which consumes a header file (for example a C-like header file) and produces source code and headers for the serialization/de-serialization on these structures. In addition, the serialization/de-serialization utility generates allocators/de-allocators, deep copy operators, comparison operators, setters and getters, and array resize operations. Structures may be nested and may contain arrays whose lengths are determined at run-time.

Cryptographic primitives in certain embodiments of the trusted device 130 are provided both to applications running in the isolated environment 138 and to those running on the host 110, via a common API. These primitives include at least one of: Advanced Encryption Standard (AES) encryption, including electronic codebook (ECB) mode, Galois counter mode (GCM), and Xor-Encrypt-Xor (XEX) based tweaked-cookbook mode with cipher text stealing (XTS) mode; Elliptic curve cryptography (ECC), including Elliptic Curve Diffie-Hellman (ECDH) and Elliptic Curve Digital Signature Algorithm (ECDSA), performed over a modern, peer-reviewed curve (E-521) using high-efficiency algorithms; the Secure Hash Algorithm (SHA)-256 hash function; and a key derivation routine for both AES and ECC, based on SHA-256 with a design modeled after scrypt; and a National Institutes of Standards and Technology (NIST) compliant AES-based pseudo-random number generator.

In certain embodiments, trusted device 130 applications make use of these primitives both for communicating over the file system interface, as well as in performing their intended services. Host 110 applications use these primitives primarily to communicate with the trusted device 130. The supported cryptographic primitives were chosen carefully for their modernity and trustworthiness. AES in GCM mode is recommended by the National Security Agency (NSA) Suite B cipher suite, as are ECDH, ECDSA, and SHA-256. For the ECC algorithms, curve E-521 was chosen as the highest-security of the peer-reviewed curves in common use, for which efficient, branch-free algorithms are known to exist.

It will be appreciated that the network connections shown in FIG. 1 are exemplary and that other means of establishing a communications link between the computers and devices can be used. Moreover, those having ordinary skill in the art having the benefit of the present disclosure will appreciate that the host computing device 110, and the second-party computing system 120, illustrated in FIG. 1 can have any of several other suitable computer system configurations. For example, a host computing device 110 embodied as a mobile phone or handheld computer may or may not include all the components described herein.

Figure 12:
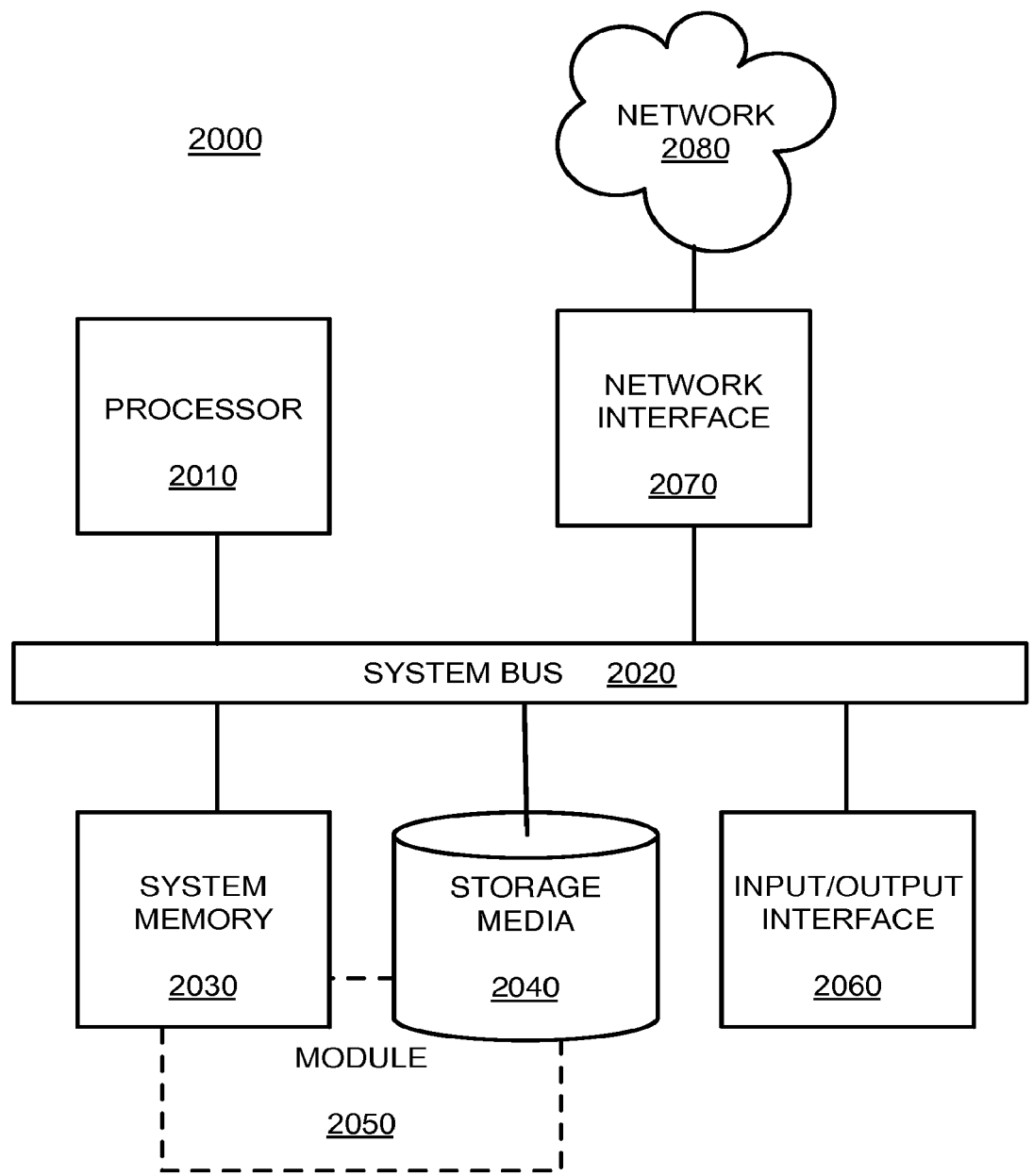
FIG. 12 is a block diagram depicting a computing machine and a module, in accordance with certain example embodiments.

In certain example embodiments, the network computing devices and any other computing machines associated with the technology presented herein may be any type of computing machine such as, but not limited to, those discussed in more detail with respect to FIG. 12. Furthermore, any modules associated with any of these computing machines, such as modules described herein or any other modules (scripts, web content, software, firmware, or hardware) associated with the technology presented herein may by any of the modules discussed in more detail with respect to FIG. 12. The computing machines discussed herein may communicate with one another as well as other computer machines or communication systems over one or more networks, such as network 105. The network 105 may include any type of data or communications network, including any of the network technology discussed with respect to FIG. 12.

Example Processes

The components of the example operating environment 100 are described hereinafter with reference to the example methods and diagrams illustrated in FIGS. 2-11. The example methods of FIGS. 2-11 may also be performed with other systems and in other environments.

Figure 4:
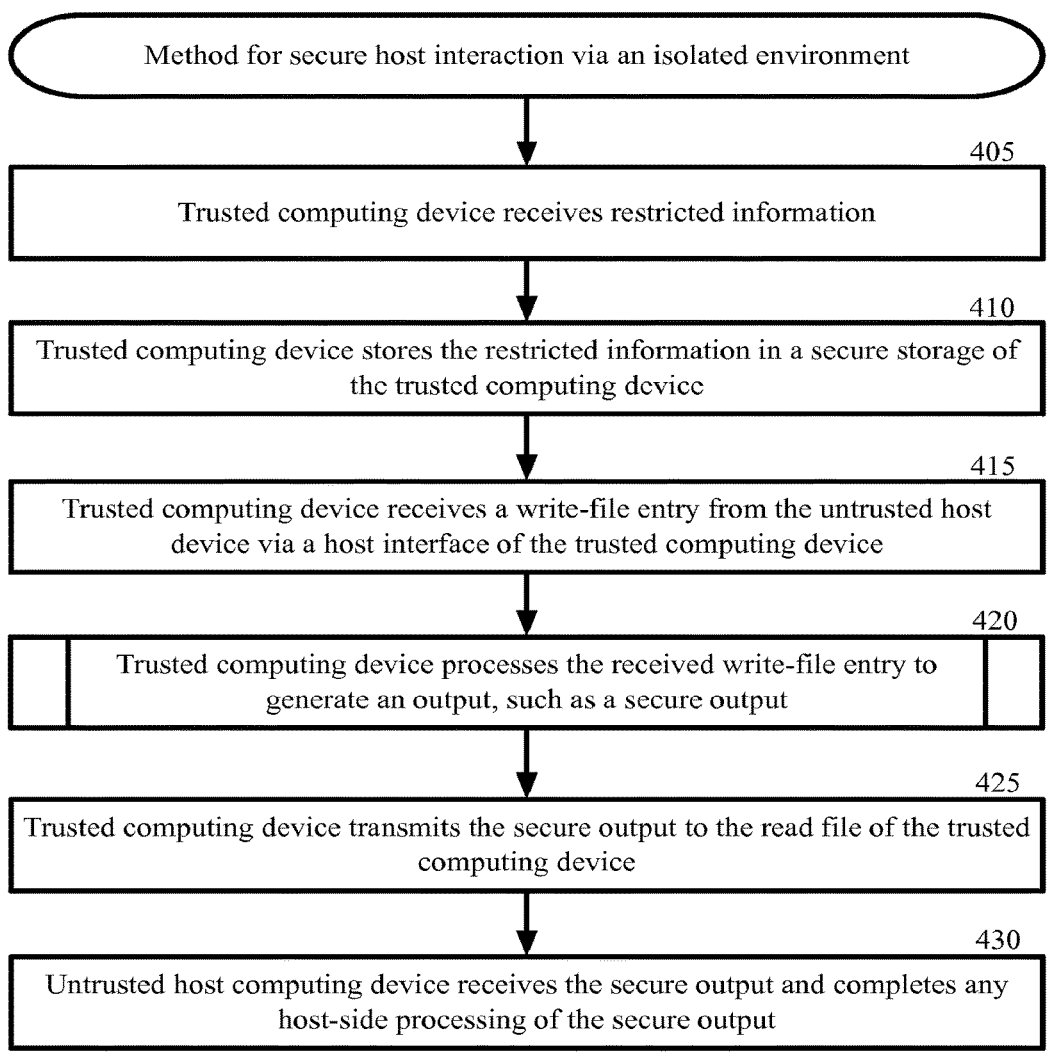
FIG. 4 is a block flow diagram depicting a method for secure host interaction via an isolated environment, in accordance with certain example embodiments.

FIG. 4 is a block flow diagram depicting a method for secure host interaction via an isolated environment 138, in accordance with certain example embodiments.

With reference to FIGS. 1-3, in block 405 of FIG. 4, the trusted device 130 receives restricted information. That is, a trusted source, such as a second-party system 130, provisions the trusted device 130 to include information that is inaccessible to an unauthorized user. The trusted device 130 then receives the information. For example, a user 101 connects the trusted device 130 to a trusted source, such as a second-party computing system 120, so that the trusted source can securely communicate restricted information to the isolated environment 138 of the trusted device 130 via the secure interface 137 of the trusted device 130. The communication occurs via the secure interface 137, so that the untrusted host device 110—which may or may not also be connected to the trusted device 130—does not have direct access to the restricted information. For example, the second-party computing system 120 may connect to the trusted device 130 via the trusted device interface 123 of the second-party computing system 120. The second-party system 120 then transmits restricted information to the trusted device 130 via the trusted device interface 123 and the secure interface 137, the secure interface 137 being isolated from the host interface 132. The isolated environment 138, such as an isolated environment processor 135 of the isolated environment 138, then receives the restricted information. The isolated environment processor 135 of the isolated environment 138 thereafter regulates access to the restricted information as described herein.

In certain example embodiments, the trusted computer device 130 receives the restricted information during the manufacture of the device, in which case provisioning via the secure interface 137 may not be necessary. Rather, the restricted information can be included directly in the secure storage 136 of the manufactured device and/or provided via the secure interface 137 during the manufacture of the trusted device 130. The isolated environment processor 135 can then retrieve and use the restricted information, as described herein.

As used herein, the "restricted information" includes any type of confidential or private information that is not publically available, such as private user information and/or cryptographic information. For example, the restricted information may include any type of personal information or personally identifiable information ("PII") of a user 101, such as the user's social security number, tax identification number, or other personal identification number of the user 101.

In certain example embodiments, the restricted information may include financial account information of the user 101, such as a financial account number, a credit card account number, a debit card account number, a personal identification number ("PIN") for a financial account, or other financial account number. Additionally or alternatively, the restricted information may include any other digital items or objects that a user 101 does not want to become publically available, such as personal photographs, documents, spreadsheets, or other objects associated with or belonging to the user 101. Additionally or alternatively, the restricted information may include event log entries; such as system log entries for the host device 110, which the trusted computing device has stored in the secure storage 136 of the isolated environment 138.

In certain example embodiments, the restricted information may additionally or alternatively include cryptographic data. For example, the processor of the trusted device 130 can use the cryptographic data to encrypt/decrypt information, such as information contained in oral and/or written communications. As one skilled in the art will appreciate, a variety of conventional cryptographic methods are compatible with the methods and systems described herein. For example, when provisioning the trusted device 130 as described herein to include a user's private financial account information, the user's financial institution may provide cryptographic data to the trusted device 130 via the secure interface 137. The cryptographic data, for example, allows the trusted device 130 to provide encrypted communications to the financial institution via the untrusted host device 110, as described herein.

In certain example embodiments, the restricted information may include information that the trusted device 130 establishes based on information received from the host device 110. For example, in certain embodiments, such as when the trusted device 130 manages and maintains system log event entries of the host device 110 as described herein, the trusted device 130 establishes event log entries based on information received from the host device 110. The trusted device 130 then maintains the event log entries as restricted information in the isolated environment 138 as described herein.

In block 410, the trusted device 130 stores the restricted information in a secure storage 136 of trusted device 130. For example, after receiving the restricted information via the secure interface 137 of the trusted device 130, the isolated environment processor 135 of the isolated environment 138 records the restricted information in the secure storage 136, so that the isolated environment processor 135 can later access the restricted information from the secure storage 136. As described herein, however, the secure storage 136 of the trusted device 130 is not directly accessible to the untrusted host device 110. Hence, the untrusted host device 110 cannot directly access the restricted information stored in the secure storage 136 of the isolated environment 138. Instead, the host device 110 accesses the isolated environment of the host interface 132 as described herein.

In block 415, the trusted device 130 receives a write-file entry from the untrusted host device 110 via a host interface 132 of the trusted device 130. That is, once the trusted device 130 is connected to an untrusted host device 110 as described herein, the untrusted host device 110 transfers data, in the form of a write-file entry, to the write file 133 associated with the host interface 132 of the trusted device 130. For example, the host device 110 transfers the data via the auxiliary interface 113 of the host device 110. The write file 133 associated with the host interface 132 of the trusted device 130 then receives the write-file entry.

By transferring the write-file entry to the trusted device 130, a user 101 can utilize the untrusted host device 110—along with the trusted device 130—to complete tasks on behalf of the user 101, without exposing the restricted information to the host device 110. For example, a user 101 may provide a command or input to the untrusted host device 110 that requires access to the restricted information, such as access to the user's financial account information stored in the secure storage 136. In response to the command or input, for example, the untrusted host device 110 transmits the write-file entry to the write file 133 of the trusted device 130. The write file 133 of the trusted device 130 then receives the write-file entry via the secure interface 132.

In certain example embodiments, the write-file entry may include any content related to the restricted information stored in the secure storage 136 of the trusted device 130. For example, the write-file entry may include an executable command or request regarding the financial account information of the user 101 that is stored in the secure storage 136, such as a request to transfer or withdrawal money from a user financial account. Additionally or alternatively, the write-file entry may include an executable command or request relating to the user's social security card number, tax identification number, or other personal identification number of the user 101. Additionally or alternatively, the write-file entry may include an executable command or request relating to digital items or objects that the user 101 does not want to become publically available, such as personal photographs, documents, spreadsheets, or other objects associated with or belonging to the user 101. In certain example embodiments, the write-file entry may include event log entry information that, as described herein, the trusted device 130 establishes as restricted information.

Further, because the write-file entry can include any content related to the restricted information, the write-file entry also provides an indication of the type of information, such as restricted information stored in the secure storage 136, that may be responsive to the write-file entry. For example, if the write-file entry includes an executable command or request to process a money transfer or money withdrawal for the user 101, the content of the write-file entry—that is, the money transfer or withdrawal request provides an indication that information responsive to the write-file entry includes the financial account information of the user 101. Such responsive financial account information may include, for example, the user's financial account number and any PIN associated with the financial account number. In certain example embodiments, the indication may be a specific indication. For example, the write-file entry may include a request to transfer money from a specific financial of the user 101, such as a savings account of a user 101, to another account of the user 101, such as a checking account of the user 101.

In block 420, the trusted device 130 processes the received write-file entry to generate an output, such as a secure output. That is, in the isolated environment 138, the trusted device 130 reads the write-file entry to identify what, if any, restricted information may be responsive to the write-file entry. The trusted device 130 then determines an output based on the identified restricted information that is responsive to the write-file entry. The trusted device 130 then optionally secures the output; such as by encrypted the output, to generate a secure output. The details of block 420 are described in further detail below with reference to FIG. 5.

Figure 5:
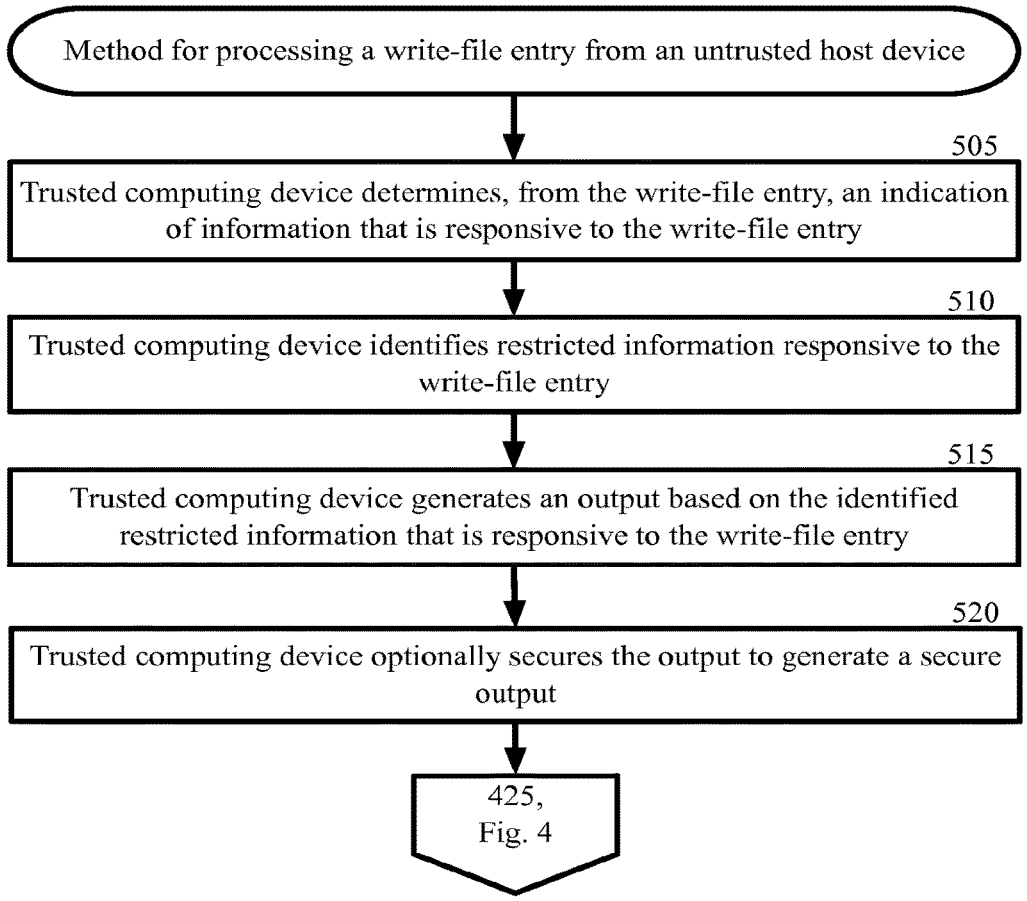
FIG. 5 is a block flow diagram depicting a method for processing a write-file entry from an untrusted host device, in accordance with certain example embodiments.

FIG. 5 is a block flow diagram depicting a method 420 for processing a write-file entry from an untrusted host device 110, in accordance with certain example embodiments and as referenced in block 420 of FIG. 4.

With reference to FIG. 5, in block 505 of method 420, the trusted device 130 determines, from the write-file entry, an indication of information that is responsive to the write-file entry. That is, after receiving the write-file entry into the write file 133 of the trusted device 130, the isolated environment processor 135 of the trusted device 130 retrieves the write-file entry from the write file 134. The isolated environment processor 135, for example, then reads the content of the write-file entry. By reading the content of the write-file entry, the isolated environment processor 135, for example, determines what (if any) restricted information may be responsive to the write-file entry. For example, if the write-file entry includes a request for a money transfer or withdrawal involving a financial account of the user 101, the isolated environment processor 135 determines that the write-file entry includes an indication that the user's financial account information is responsive to the write-file entry.

In certain example embodiments, the indication may be a specific indication, such as a request to transfer money between specific financial accounts of the user 101. For example, the write-file entry may include a request to transfer or withdraw money from a specific financial of the user 101, such as a savings account of a user 101. Hence, the isolated environment processor 135 may determine that the write-file entry includes an indication that the user's savings account information is responsive to the write-file entry. In other example embodiments, the write-file entry may be a request to process a payment with the user's financial information. For example, a host application 112, such as a digital wallet application, may provide a write-file entry seeking the user's financial information to complete a payment with the digital wallet application. The trusted device 130 thus determines that the write-file entry provides an indication that the user's financial information, such as a financial account number, is needed to process the digital wallet payment request.

In block 510, the trusted device 130 identifies restricted information responsive to the write-file entry. That is, based on the indication of information responsive to the write-file entry, the trusted device 130 reads the contents of the secure storage 136 for any restricted information relevant to the write-file entry. For example, if the isolated environment processor 135 determines that the write-file entry includes an indication that the user's financial account information is responsive to the write-file entry, the isolated environment processor 135 reads the contents secure storage 136 to identify the user's financial account information.

As described herein, the secure storage 136 may include a variety of restricted information. Hence, in certain example embodiments, the isolated environment processor 135 may identify only that portion of the restricted in formation that is responsive to the write-file entry. For example, if the determined indication relates only to the user's savings account number—and not a checking account number of the user 101—the isolated environment processor 135 may only identify the user's savings account number as the portion of restricted information that is responsive to the write-file entry.

In block 515, the trusted device 130 generates an output based on the identified restricted information that is responsive to the write-file entry. That is, the isolated environment processor 135 of the trusted device 130 applies the identified restricted information to any executable command or request included in the write-file entry, so as to carry out any instruction pertaining to the write-file entry. The isolated processor 135 then creates an output that is responsive to the write-file entry.

In certain example embodiments, such as when the write-file entry provides an indication that the user's financial account information is responsive to the write-file entry, the output may relate to a financial transaction involving an account of the user 101. For example, if the write-file entry involves a request for a money transfer or withdrawal from a user financial account, the trusted device 130 may generate an output that can be used to initiate and approve the financial transaction. That is, the isolated environment processor 135 may, based on the user's identified account information in the secure storage 136, generate a communication that the untrusted host device 110 can send to the user's bank or other financial institution. The communication may include, for example, the specific account information of the user 101, the user's name, PIN, and/or the amount to be transferred or withdrawn. Including the user's PIN, for example, may constitute approval for the transfer or withdrawal. In the case of a money transfer or withdrawal, the communication may include information about the account to which the money is to be transferred or withdrawn, such as another account of the user (or an account belonging to a different user). For example, if the user 101 is transferring money from the user's savings account to the user's checking account, the communication may include both the user's savings account number and the user's checking account number.

In block 520, the trusted device 130 optionally secures the output to generate a secure output. That is, in certain example embodiments, the isolated environment processor 135 optionally modifies or changes the output so that the output will not disclose the contents of the restricted information to any unauthorized user. For example, the isolated environment processor 135 may encrypt the output, such as by retrieving and applying any cryptographic data previously stored in the secure storage 136 of the trusted device 130. Encrypting the output, for example, thus provides a secure output. If the output relates to a financial transaction involving a savings account of the user 101, for example, the output may include the user's savings account number. The isolated environment processor 135 thus encrypts the user's savings account number, along with any other restricted information, so that the restricted information of the user 101 will not be understandable to an unauthorized user that may have or gain access to the host device 110 (and hence the contents of the host device 110).

In certain example embodiments, the encryption may be based on a hash value of the user's restricted information. For example, the encryption may be based on a hash value of the user's financial account information and information identifying the user, such as a financial account number of the user and the user's identifying information. As those skilled in the art will appreciate, a number of hashing methods are available to encrypt the restricted information.

Returning to FIG. 4, in block 425 of FIG. 4, the trusted device 130 transmits the output, such as an output the trusted computing device 130 has secured, to the read file 134 of the trusted device 130. For example, when the isolated environment processor 135 encrypts an output that is responsive to the write-file entry—thus generating a secure output—the isolated environment processor 135 communicates the secure output to the read file 134 of the trusted device 130. The read file 134 receives the secure output, thus making the secure output available and accessible to the untrusted host device 110. In certain example embodiments, such as discussed below with reference to FIG. 6, the trusted device 130 optionally receives a secure authorization from the user 101 before processing the write-file entry to generate an output and/or before transmitting the secure output to the read file 134.

In block 430, the untrusted host device 110 receives the output, such as the secure output, and completes any host-side processing of the secure output. That is, the untrusted host device 110 accesses the read file 134 via the auxiliary interface 113 of the host device 110 and the host interface 132 of the trusted device 130. The untrusted host device 110 then reads the output, such as the secure output. By reading the output, for example, the untrusted host device 110 determines the content of the output. For example, by reading the content of the output, the untrusted host device 110 may determine that the output is a secure output that relates to a previously sent write-file entry requesting a money transfer or withdrawal. Based on the content of the secure output, the untrusted host device 110 can processes the secure output by taking any further computing action needed to utilize the secure output. For example, if the secure output in the read file 134 is a response to a write-file entry involving a money transfer or withdrawal request—and the secure output includes an encrypted approval for the transfer—the untrusted host device 110 can include the secure output into a transmission to the intended financial institution recipient via the network 105. In other words, the additional processing includes transmitting the secure output to the financial institution of the user 101.

In a financial transaction involving the user's restricted information, for example, such as a money transfer or withdrawal described herein, the actual restricted information of the user—such as the user's financial account information—is never made publically available to the untrusted host device in an non-secure form. Rather, only an encrypted, secure output, for example, may be made available to the untrusted host device 110 for transmission over the network 105 to the user's financial institution. Once the user's financial institution receives the secure output for example, the financial institution can use the cryptographic data corresponding to the cryptographic data used to provision the trusted device 130 to decrypt the secure output. The financial institution can then take any action associated with the secure output, such as completing a money transfer or withdrawal for the user 101.

In certain example embodiments, if the output is a secure approval for a payment—such as a payment via a digital wallet application the digital wallet application may use the secure output to complete the payment on behalf of the user 101. For example, the digital wallet application of may wirelessly transmit the secure output to a credit card terminal of a merchant (not shown). The merchant terminal receives the secure output, for example, and then transmits the secure output to the correct acquiring bank/issuer, such as along traditional credit card rails. Additionally or alternatively, the merchant may transmit the secure output authorizing the payment via the network. The acquiring bank/issuer, for example, then receives and decrypts the secure output to complete the payment transaction.

Figure 6:
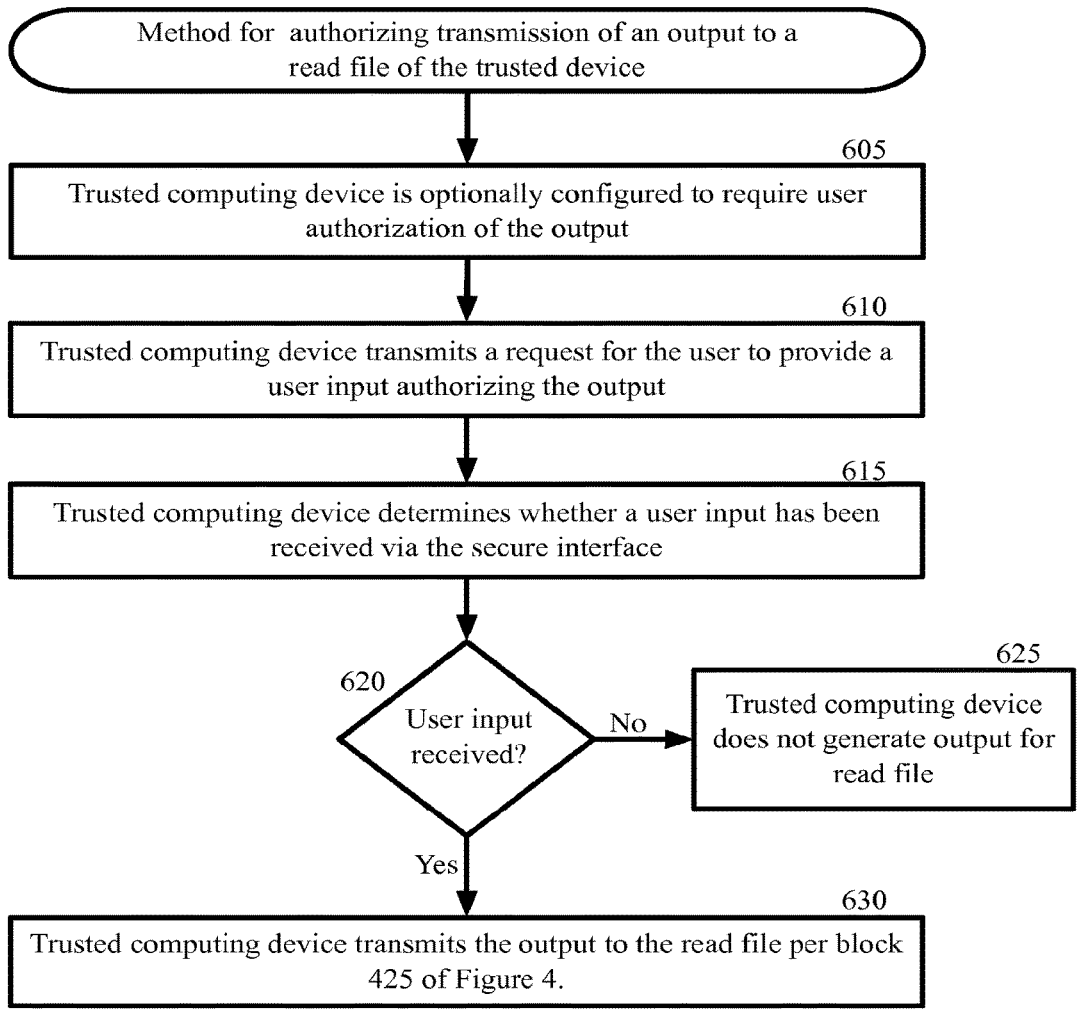
FIG. 6 is a block flow diagram depicting a method for authorizing transmission of an output to a read file of the trusted device, in accordance with certain example embodiments, in accordance with certain example embodiments.

FIG. 6 is a block flow diagram depicting a method 600 for authorizing transmission of the output to the read file 134, in accordance with certain example embodiments.

With reference to FIG. 6, in block 605 of method 600, the trusted device 130 is optionally configured to require user authorization of the output, such as authorization of the secure output. That is, in certain example embodiments, an authorized user 101 and/or a manufacturer of the trusted device 130 may optionally require the device to provide a request seeking authorization to process the write-file entry or transmit the secure output to the read file 134. For example, a user 101 may access the trusted device 130 via the secure interface 137 and input or select a control option requiring user authorization. Based on the input or selection of the user 101, the trusted device 130 may thereafter require a "proof of life" and/or identity confirmation—such as a challenge-response authentication procedure—before processing the write-file entry or transmitting the output to the read file 134, as described herein. Additionally or alternatively, the manufacture of the trusted device 130 may program the device, such as during the manufacturing process, to require the "proof of life" and/or identity confirmation before processing the write-file entry or transmitting the output to the read file 134.

In block 610, if the trusted device 130 is configured to require a "proof of life" and/or identity confirmation before processing the write-file entry or transmitting the output to the read file 134, the trusted device 130 transmits a request for the user 101 to provide a user input authorizing the output, such as the secure output. That is, the trusted device 130 provides a signal or other communication to the user 101 to authorize processing of the write-file entry to generate a secure output and/or transmission of the secure output to the read file 134. The signal can be any type of signal to the user, with the signal originating with the trusted device 130. For example, the signal may be a blinking light on the body of the trusted device 130 and/or an audible notification originating from a speaker associated with the trusted device 130.

In block 615, the trusted device 130 determines whether a user input has been received via the secure interface 137. For example, if the signal to provide a user input is a blinking light and/or audible notification, then the user 101 receives the signal and if appropriate—provides an input into the trusted device 130 via the secure interface 137. Based on the received user input from the user 101, the trusted device 130 determines that a user input has been received into the secure interface 137 of the trusted device 130. If the user 101 does not provide a user input, the trusted device 130 determines that no user input has been received.

In certain example embodiments, the user input may be a direct input into the secure interface 137. For example, the user may touch a sensor associated with the secure interface 137 of the trusted device 130, thereby providing a user input into the sensor (and hence the trusted device 130). In certain embodiments where identity confirmation is desired, for example, the user 101 may also enter a user-specific security code directly into a user interface of the secure interface 137 of the trusted device 130. For example, the user may enter a Personal Identification Number ("PIN") that is unique to the user 101 into a push-button user interface of the secure interface 137.

In certain example embodiments, the user input may be via a wireless input. For example, the user 101 may have a wireless key fob capable of connecting to the trusted device 130 via the secure interface 137. The key fob, for example, may rely on Bluetooth and/or Near Field Communication ("NFC") technology to transmit a user input to the trusted device 130 via the secure interface 137. In certain example embodiments, the wireless user input may include a security code that the fob transmits to the trusted device 130 via the secure interface. As those skilled in the art will appreciate, the wireless input may be an encrypted signal. In such embodiments, the trusted device 130, for example, may be provisioned to include cryptography data capable of decrypting the wireless input.

In certain example embodiments, a user 101 and/or trusted device manufacturer may configure a specific response period to receive the user input. For example, a user 101 and/or trusted device manufacturer may set a period of about 5 to 10 seconds for the user 101 to respond with an input, such a 5, 6, 7, 8, 9, or 10 seconds. In certain example embodiments, the period may be longer, such as about 60 seconds. If the user 101 does not respond with a user input within the configured response period, for example, the trusted device 130 determines that no input has been received. Conversely, if the user 101 does provide a user input within the configured response period, the trusted device 130 determines that a user input has been received.

In block 620, if the trusted device 130 determines that a user input has been received via the secure interface 137, the method follows the "YES" branch of block 620 to block 630 of FIG. 6, in accordance with certain example embodiments. If the trusted device 130 determines that a user input has not been received via the secure interface 137, the method follows the "NO" branch of block 620 to block 625 of FIG. 6, in accordance with certain example embodiments.

In block 625, if the trusted device 130 determines a user 101 has not provided a user input, the trusted device 130 does not generate an output to the read file 134. For example, the isolated environment processor 135 of the trusted device 130 may not process a write-file entry to generate an output as described herein, or the isolated environment processor 135 may cease any existing processing the write-file entry (if the isolated environment processor 135 has already begun processing the write-file entry). Additionally or alternatively, if the isolated processor has already processed the write-file entry to generate an output as described herein, the isolated environment processor 135 may not transfer the output to the read file 134. Hence, regardless of where in the process of generating an output or transferring the output to the read file 134, ceasing the method in response to the lack of a user input into the secure interface 137—prevents an output from being transmitted to the read file 134. As such, the untrusted host device 110 is not able to receive an output, such as a secured output, as described herein.

In block 630, if the trusted device 130 determines that a user has provided a user input, the trusted device 130 transmits the output to the read file 134 as described in block 425 of FIG. 4. That is, after the isolated environment processor 135 completes any processing needed to generate the output, such as described in blocks 505 to 520 of FIG. 5, the 136 communicates the output to the read file 134 of the trusted device 130. In certain example embodiments, the trusted device 130 also secures the output as described herein, such as by encrypting the output to create a secure output. The read file 134 receives the secure output, thus making the secure output available and accessible to the untrusted host device 110, as described herein.

By configuring the trusted device 130 to require a "proof of life" and/or identity confirmation, a user 101 and/or trusted device 130 manufacturer can enhance security associated with the trusted device 130. For example, if the trusted device 130 is configured to require a user 101 to touch the body of the device 130 before the device 130 transmits a secure output to the read file 134 as described herein, then a user 101 must be in actual proximity to the trusted device 130. An unauthorized user 101, for example, thus cannot remotely instruct the trusted device 130 to proceed with transmission of the secure output to the read file 134.

In certain example embodiments, such as when the trusted device 130 is configured to require a user 101 to enter a security code directly into the device 130, the entry of the security code both verifies that a user 101 is present and further confirms the identity of the user 101. In other words, the fact that the user 101 knows the correct security code and correctly enters the security code as the user input into the trusted device 130—further confirms that the user 101 is present and is also an authorized user 101. An unauthorized user, for example, would presumably not possess the security code, and thus not be able to provide the security code to the trusted device 130.

Figure 7:
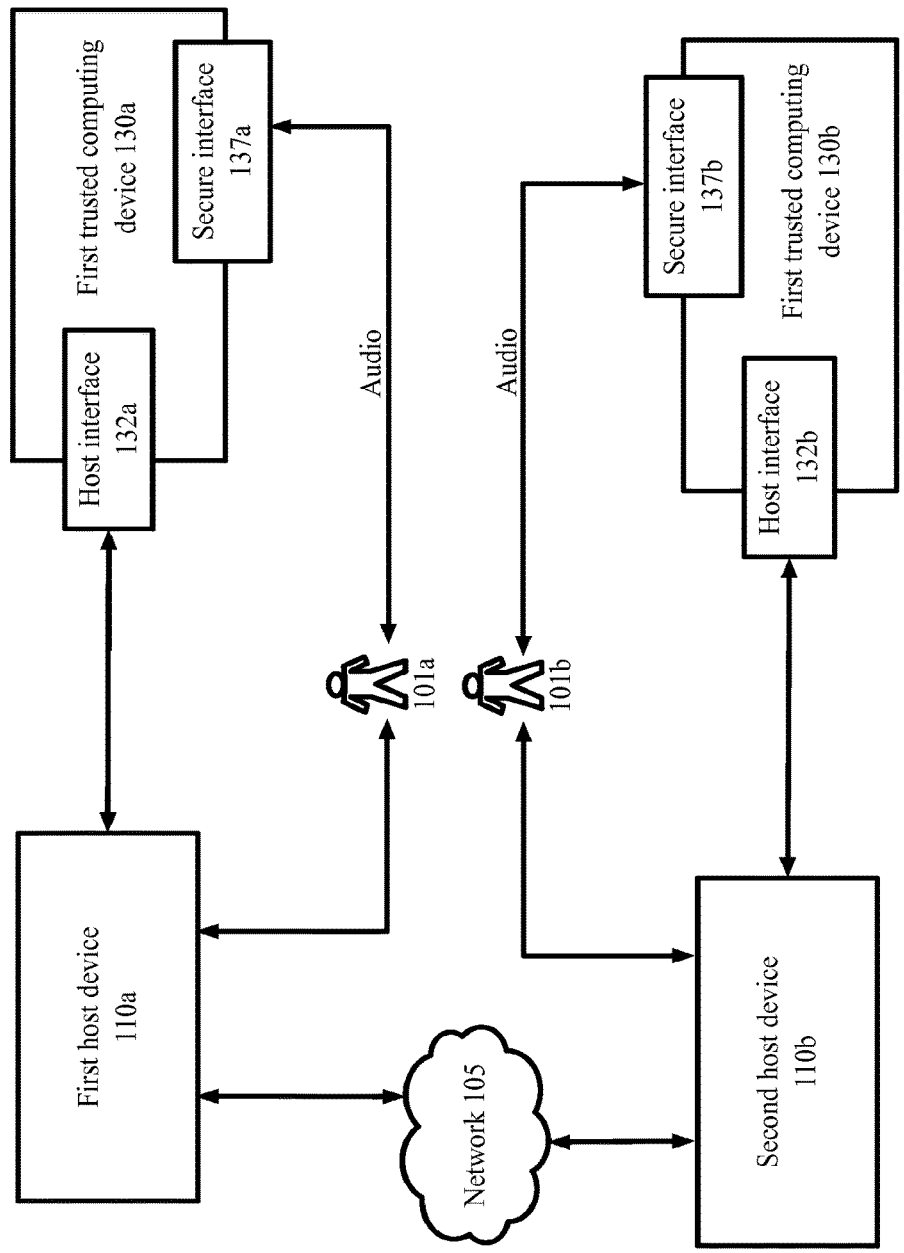
FIG. 7 is a block diagram depicting a system for secure communications between two or more host computing devices, in accordance with certain example embodiments.

FIG. 7 is a block diagram depicting a system 700 for secure communications between two or more host computing devices, in accordance with certain example embodiments.

With reference to FIG. 7, provided is a first host device 110a that is associated with a first trusted device 130a, the first trusted device 130b being configured as described herein. For example, among the other components described herein, the first trusted device 130a includes a host interface 132a for connecting to the first host device 110a and a first secure interface 137a, such as for receiving and transmitting restricted information, such as confidential communications. Likewise, FIG. 7 shows second host device 110b that is associated with a second trusted device 130b, the second trusted device 130b being configured as described herein. For example, among the other components described herein, the second trusted device 130b includes a second host interface 132b for connecting to the second host device 110b and a second secure interface 137b, such as for receiving and transmitting restricted information, such as confidential communications. Also shown is a network 105, which the first host device 110a and the second host device 110b can employ for network-based communications. By configuring a system such as shown in FIG. 7 and in accordance with the embodiments provided herein, two users, such as a first user 101a and a second user 101b can exchange secure communications. Such methods, for example, are described in detail below with reference to FIG. 8.

Figure 8:
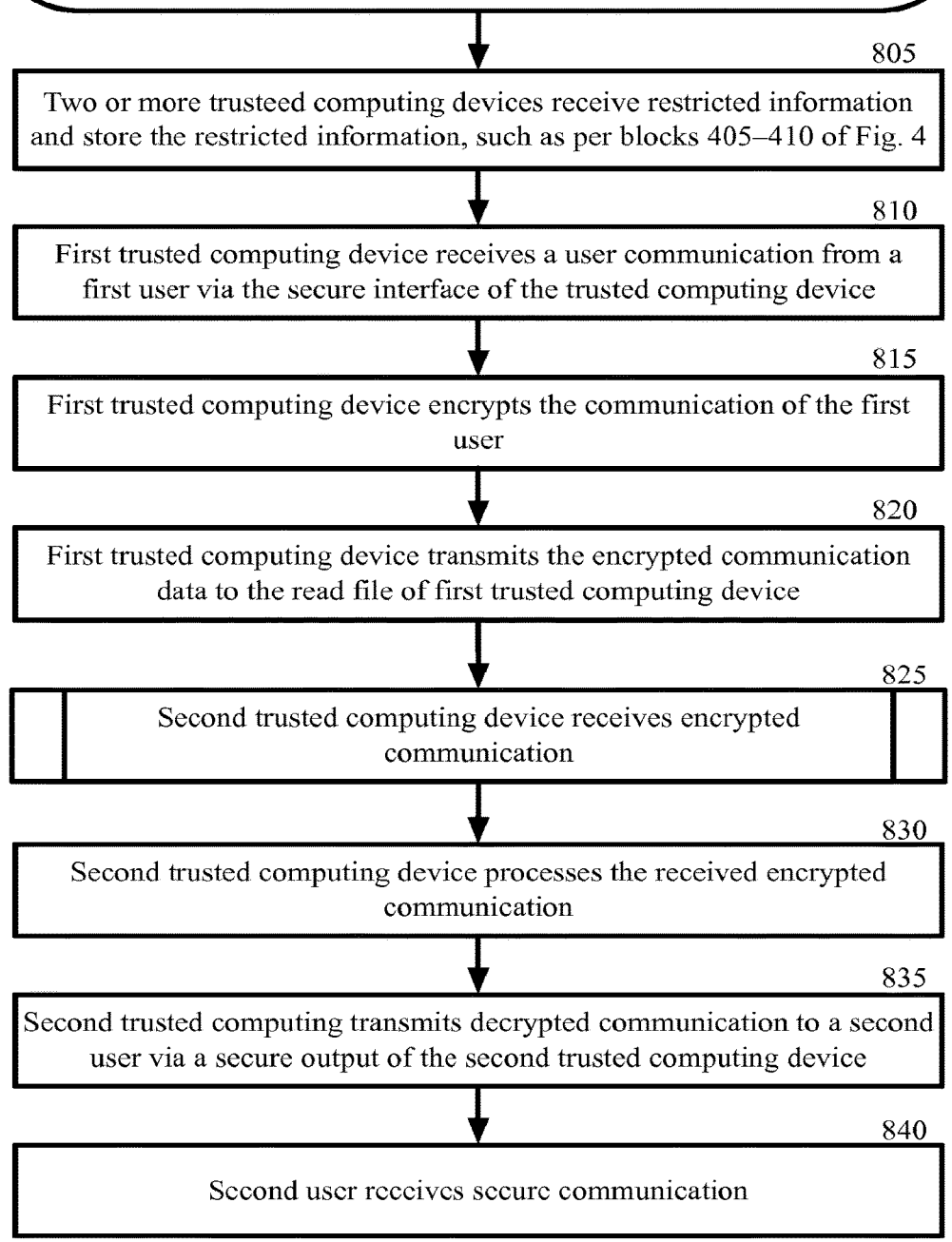
FIG. 8 is a block flow diagram depicting a method for secure communication between untrusted host devices, in accordance with certain example embodiments.

FIG. 8 is a block flow diagram depicting a method 800 for secure communication between untrusted host devices 110, in accordance with certain example embodiments.

With reference to FIGS. 1-3 and FIG. 7, in block 805 of FIG. 8 of method 800, two or more trusted devices 130 receive restricted information and store the restricted information in secure storage 136, such as per blocks 405 to 415 of FIG. 4. That is, each of two or more trusted devices 130 is securely provisioned to include restricted information that is inaccessible to an unauthorized user. The trusted device 130 then store the restricted information, such as cryptographic data used to generate and decipher encrypted communications, a secure storage 136 of each of the trusted devices 130.

In certain example embodiments, two users, such as user 101a and user 101b, may "pair" two or more trusted devices 130 together so that the two trusted devices 130 exchange restricted information. For example, each of two trusted devices 130a and 103b may be removably attached to or integrated with two separate headsets designed to facilitate user communications. By brining the headsets into proximity to each other, the users 101a and 101b can allow the trusted devices 130a and 130b of the headsets to exchange restricted information via the secure interface 137, such as cryptographic data. For example, the two trusted devices 130a and 130b of each headset may exchange cryptographic keys via a Bluetooth connection and/or Near Field Communication ("NFC") connection. Each trusted device 130a and 130b then stores the corresponding cryptographic data in the secure storage 136 of each trusted device 130a and 130b, so that the cryptographic data is not directly accessible to any untrusted host device, such as host devices 130a and 130b, that may connect to the headsets.

Additionally or alternatively, and in certain example embodiments the manufacturer of the trusted devices 130a and 130b may provision trusted devices 130a and 130b to include corresponding cryptographic data during the manufacturing process, such as with or without the use of the secure interface 137a and 137b, as described herein. In certain example embodiments, the cryptographic data may contain other information, such as the digital address of the location to which encrypted communications are to be sent. Such digital address data may be stored in the secure storage 136, for example, along with the cryptographic data.

In block 810, a first trusted device 130a receives a user communication from a first user 101a via secure interface 137a of the first trusted device 130a. That is, a first user 101a transmits a communication to the first trusted device 130a via the secure interface 137, and the isolated environment 138 receives the transmission, such as via the isolated environment processor 135. For example, after the first trusted device 130a and a second trusted device 130b are paired to possess corresponding cryptographic data, a first user 101a may speak into a headset microphone, the microphone being integrated into or associated with one of the paired headsets and connected to the secure interface 137a of the first trusted device 130a. Because the microphone is connected to the first trusted device 130a via the secure interface 137a, the connection is a secure connection that does not expose the first user's audible communication to any untrusted host device 110a that is associated with the headset.

In block 815, the first trusted device 130a encrypts the communication of the first user 101. For example, after the first trusted device 130a receives the communication from the first user 101a, the isolated environment processor 135 of the first trusted device 130a retrieves the previously retrieved cryptographic data from the secure storage 136. The isolated environment processor 135 of the first trusted device 130a then applies the retrieved cryptographic data to the communication received from the first user 101a, thus encrypting the communication to generate a secure output.

Because the encryption of the communication from the first user 101a occurs in an isolated environment 138 of the first trusted device 130a, the unencrypted communication remains inaccessible to any untrusted host device 110a that is associated with a headset containing the first trusted device 130a. In certain example embodiments, the first trusted device 130 may associate digital address information, such as unencrypted digital address information, with the encrypted communication. As described herein, the isolated processor 135 of the first trusted device 130a may use any unencrypted digital address information, for example, to communicate the encrypted communication to the correct recipient (such as the second user 101b).

In block 820, the first trusted device 130a transmits the encrypted communication data to the read file 134 of first trusted device 130a. For example, once the isolated processor 135 of the first trusted device 130a encrypts the communication to generate a secure output as described herein, the isolated environment processor 135 of the first trusted device 130a communicates the encrypted communication—as the secure output—to the read file 134 of the first trusted device 130a. The read file 134 of the first trusted device 130a receives the encrypted communication, thus making the encrypted communication available to an untrusted host device 110.

In certain example embodiments, such as discussed herein with reference to FIG. 6, the first trusted device 130 may optionally require a secure authorization from the first user 101a before transmitting the encrypted communication (that is, the secure output in this example embodiment) to the read file 134. For example, the first user 101a may, in response to a request from the first trusted device 130a, enter a security code into trusted device 130a before any communications can be encrypted and/or transmitted to the write file. As described with reference to FIG. 6, in such example embodiments receipt of the user input is required before the isolated environment processor 135 of the trusted device 130 transmits the output, such as the secure output, to the read file 134 where the host device 110 can receive the output.

In block 825, the second trusted device 130b receives encrypted communication. For example, the first untrusted host device 110a that is associated with the first trusted device 130a receives the encrypted communication from the read file 134 of the first trusted device 130a, along with any unencrypted data such digital address data indicating where the encrypted communication should be sent. The first untrusted host device 110 then transmits the encrypted communication to a second untrusted host device 110b, the second untrusted host device 110b, for example, being associated with a second trusted device 130b. The second trusted device 130b, for example, may be part of a headset that was previously paired with the headset containing the first trusted device 130a. Hence, the first and second trusted devices (130a and 130b of FIG. 7) share corresponding cryptographic data, as described herein. The details of block 825 are described in further detail below with reference to FIG. 9.

Figure 9:
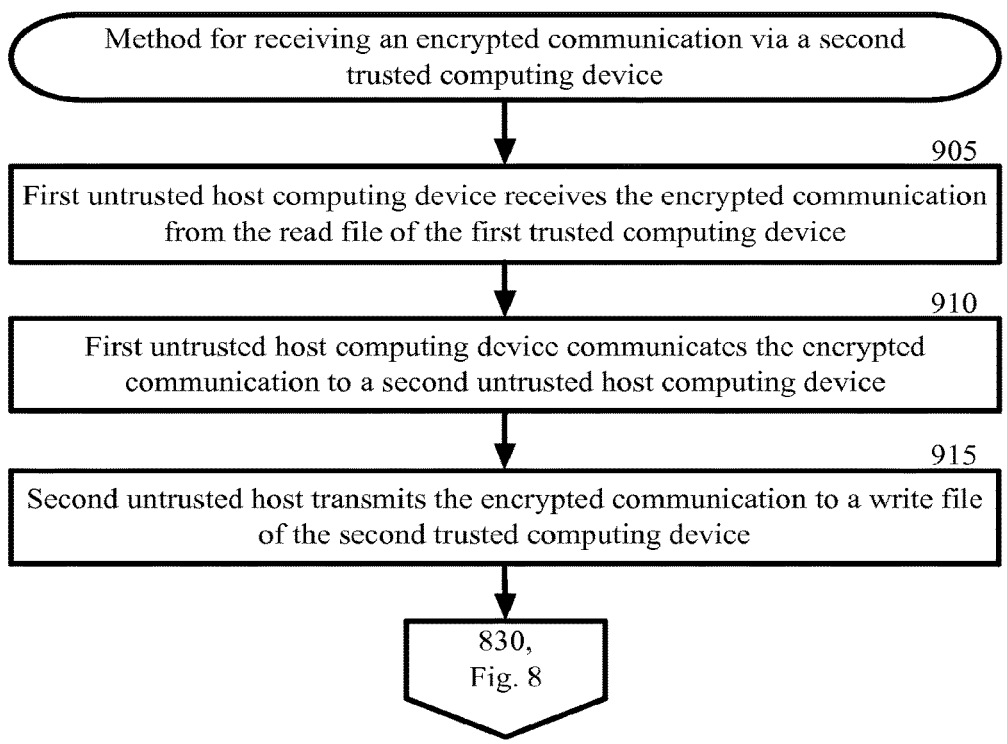
FIG. 9 is a block flow diagram depicting a method for receiving an encrypted communication via a second trusted device, in accordance with certain example embodiments.

FIG. 9 is a block flow diagram depicting a method 825 for receiving an encrypted communication via a second trusted device 130b, in accordance with certain example embodiments.

With reference to FIGS. 1-3 and FIG. 7, in block 905 of method 825, the first untrusted host device 110a receives the encrypted communication from read file 134 of the first trusted device 130a. That is, the first untrusted host device 110a accesses the read file 134 via this host interface 132a of trusted device 130a. The first untrusted host device 110a then reads the contents of the read file 134 of the first trusted device 130a, such as to determine that the read file 134 includes an encrypted communication as the output. By reading and determining the contents of the read file 134 of the trusted device 130a, the first untrusted host device 110a receives the encrypted communication.

In certain example embodiments, the first untrusted host device 110a may also read data associated with the encrypted communication, such as data pertaining to the digital address of the location to where the encrypted communication is to be sent. The first untrusted host device 110a can then use the address information to transmit the encrypted to the second untrusted host device 110b. In other words, the first host device 110a may perform additional processing relating to the first communication, such a determining where to transmit the first communication.

In certain example embodiments, the first untrusted host device 110a may be a mobile phone or other mobile device of the first user 101a. The mobile phone, for example, may be connected to a wireless headset, the headset including an integrated or removably attached first trusted device 130a, as described herein. The first untrusted device 110a, such as the user's mobile phone, can then receive the encrypted communication as described herein via the wireless connection with the headset, such as a Bluetooth and/or Near Filed Communication ("NFC") connection. Additionally or alternatively, the connection between the first untrusted host device 110a and a first trusted device 130a that is integrated into or removably attached to a headset may be a wired connection or other direct connection.

In block 910, the first untrusted host device 110a communicates the encrypted communication to the second untrusted host device 110b. That is, the first untrusted host device 110a transmits the encrypted communication to the second untrusted host device 110b, such as via the network 105, so that the second untrusted host device 110b receives the encrypted communication. For example, the first untrusted host device 110 may rely on any digital address information associated with encrypted communication to identify the location of the second untrusted host device 110b. The first untrusted host device 110a then transmits the encrypted communication to the digital address associated with the encrypted communication via the network, and the second untrusted host device 110b receives the encrypted communication.

In certain example embodiments, such as when the encrypted communication is not associated with a digital address for the recipient of the encrypted communication, the first user 101a may select a digital address for transmitting the communication, such as from the user's contacts. For example, the first user 101a may select a second user 101b as a recipient for the encrypted communication from a contacts application on the host device 110a of the first user 101a. Based on the selection of the first user 101a, in such embodiments, the first untrusted host device 110a transmits the encrypted communication to the digital address of the selected second user 101b. The second untrusted host device 110b, such as the second user's mobile phone, then receives encrypted communication.

In block 915, after receiving the encrypted communication from the first untrusted host device 110a, the second untrusted host device 110b transmits the encrypted communication to a write file 133 of a second trusted device 130. That is, the second untrusted host device 110 transfers the received encrypted communication from the second untrusted host device 110 to the write file 133 of the second trusted host device 130b associated with the second untrusted host device 110b. For example, the second untrusted device 110b may be connected wirelessly or via a wire, as described herein, to a headset containing the second trusted device 130b. To transmit the encrypted communication to the second trusted device 130b, for example, the second untrusted host device 110b transfers the encrypted communication over the wired or wireless connection, such as through a host interface 132b of the second trusted device 130b, to the write file 133 of the second trusted device 130b.

In certain example embodiments, the second untrusted device 110b may be a mobile phone or other mobile device of the second user 101b. For example, the mobile phone of the second user 101b receives the encrypted communication from the mobile device of the first user 101a, such as via the network 105. The second user's mobile phone receives the encrypted communication, and then transmits the encrypted communication to a headset of the second user 101b, such as via a Bluetooth and/or Near Field Communication ("NFC") connection between the headset and the mobile phone of the second user 101b. A second trusted device 130b that is integrated with (or removably attached to) the headset of the second user 101b receives the encrypted communication into the write file 133 of the second trusted device 130b as a write-file entry.

Returning to FIG. 8, in block 830 of FIG. 8, the second trusted device 130b processes the received encrypted communication. That is, the isolated environment processor 135 of the second trusted device 130b retrieves the secure communication from the write file 133 of the second trusted device 130b. The isolated environment processor 135 then decrypts the encrypted communication based on the previously received cryptography data, such as the cryptography data received during a pairing of the first trusted device 130a and the second trusted device 130b.

In certain example embodiments, the processing for block 830 of FIG. 8 follows the method described in blocks 505 to 510 of FIG. 5. For example, the isolated environment processor 135 of the second trusted device 130b reads the write-file entry to identify the entry as an encrypted communication. The isolated environment processor 135 then determines that the stored cryptography data is responsive to the write-file entry, inasmuch as the isolated processor 105 of the second trusted device 130b can use the cryptography data to decrypt the encrypted communication. By retrieving and applying the cryptography data, for example, the isolated environment processor 135 of the second trusted computing device 130b generates a decrypted communication from the first communication of the first user 101a.

In block 835, the second trusted device 130b transmits the decrypted communication to the second user 101b via a secure interface 137b of the second trusted device 130b. For example, after the isolated environment processor 135 generates a decrypted communication, the isolated environment processor 135 of the second trusted device 130b may transfer the decrypted communication to a speaker that is connected to the secure interface 137 of the second trusted device 130b. The speaker, for example, may be located in an earpiece of the headset of the second user 101, such that any output of the speaker is directly into the ear of the second user 101. Using the secure interface 137, for example, the isolated environment processor 135 transmits the decrypted communication to the second user 101 by directing the speaker to provide an audible output of the decrypted communication. The second user 101 can then receive the audible output of the decrypted communication.

By the time the communication of the first user 101*a* reaches the ear of the second user 101*b*, the communication has only passed through untrusted hosts (that is, the first untrusted host device 110*a* and the second untrusted host device 110*b*) in an encrypted form. Hence, an untrusted host device does not have access to the unencrypted communication, thus allowing the first user's communication to remain private. And, because the communication only passes through the untrusted host devices in an encrypted form, the communication from the first user 101*a* to the second user 101*b* is far less vulnerable to unauthorized users that may attempt to eavesdrop or intercept the communication.

While the above embodiments describe a one-way communication from a first user 101*a* to a second user 101*b*, those skilled in the art will appreciate—in view of the disclosure herein—that such processes can be reversed to complete a two-way communication. That is, the processes described herein can be reversed to provide a secure communication from the second user 101*b* to the first user 101*b*. For example, the second user 101*b* may desire to securely respond to the first communication of the first user 101*a* by providing a second communication to the first user 101*a*.

In such example two-way communication embodiments, the second user 101*b* may speak into a microphone that is connected to the second trusted computing device 130*b*. The second trusted computing device 130*b* receives the communication via the secure interface 137*b*. After receiving the communication, the isolated environment processor 135 of the second trusted computing device 130*b* encrypts the second communication and then transfers the encrypted communication to a read file 134 of the second trusted computing device 130*b*. In certain example embodiments, the second trusted computing device 130 may require a user input from the second user 101*b* to authorize the encryption transmission to the second untrusted host device 110*b*, as described herein.

After the second untrusted host device 110*b* receives the encrypted second communication from the read file of the second trusted computing device 130*b*, the second untrusted host device 110*b* transmits the encrypted communication to the first untrusted host device 110*a*. The first untrusted host device 110*a* then transmits the encrypted communication to a write file 133 of the first trusted computing device 130*a*. The isolated environment processor 135 of the first trusted computing device 130*a* decrypts the encrypted second communication, and then provides the decrypted second communication to the first user 101*a*. For example, the first trusted computing device 130*a* provides the decrypted second communication as an audio output via a speaker that is connected to the secure interface 137*a* of the first trusted computing device 130*a*. The speaker, for example, may be intergraded into a headset of the first user 101*a*, thus allowing the audio output to be directly provided to the ear of the first user 101*a*.

Figure 10:
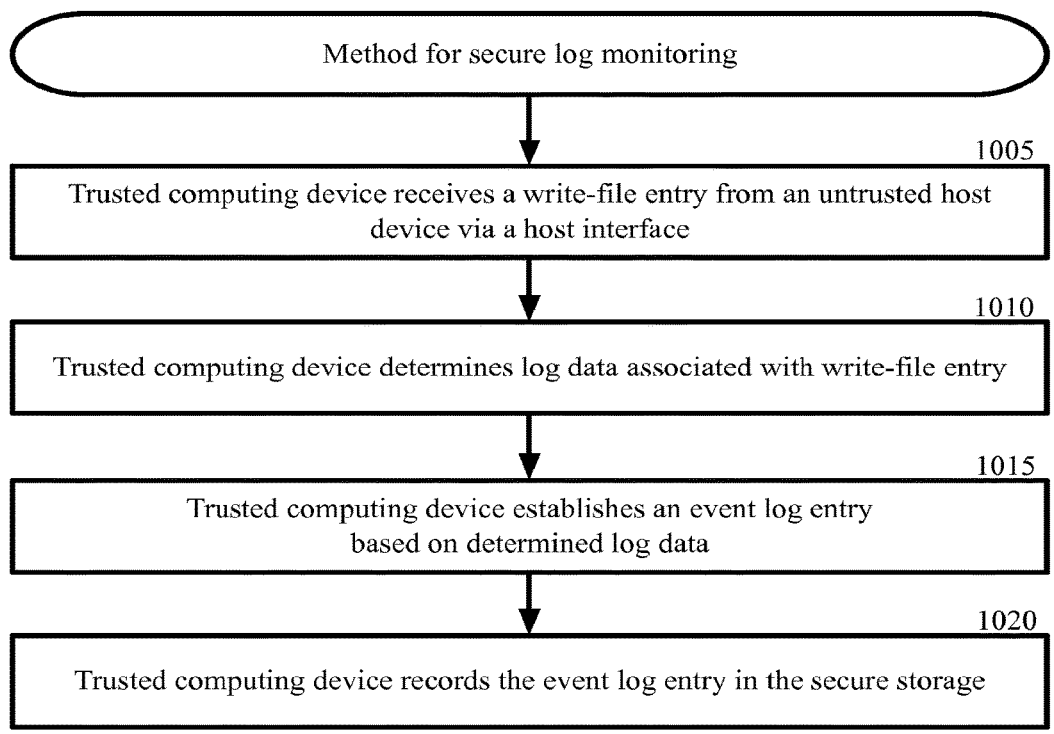
FIG. 10 is a block flow diagram depicting a method for secure event log management, in accordance with certain example embodiments.

In addition to the above methods, a user 101 can also use the trusted device 130 to securely manage host system event log entries. FIG. 10 is a block flow diagram depicting a method 1000 for secure event log management, in accordance with certain example embodiments.

With reference to FIGS. 1-3, in block 1005 of FIG. 10, a trusted computing device receives a write-file entry from an untrusted host device 110 via a host interface 132. That is, the untrusted host device 110 transfers information to the write file 133 of the trusted computing device 130, and the trusted computing device 130 receives the information as a write-file entry into the write file 133 of the trusted computing device 130, such as described herein in block 410 of FIG. 4. The transmission occurs via the host interface 132 of the trusted computing device 130.

In certain example embodiments, the write-file entry relates to system log information of the host device 110. That is, the host device 110 may transfer system log information of the host device 110 to the write file 133 of the trusted computing device 130 as write-file entries. The trusted computing device 130 then receives the system log information of the host device 110 as a write-file entry into the write file 133 of the trusted computing device 130. In such embodiments, the write-file entries may relate to or include system events that the operating system of the host device 110 may otherwise log. For example, the event logs may relate to or contain information about device changes, device drivers, system changes, system operations, or other information pertaining to the host computing system 110.

In certain example embodiments, the event logs may include application (program) events, with the events being classified as an error, a warning, or other information, depending on the severity of the event. An event log for an error, for example, may include a loss of data. Other event logs may relate to or include security-related events, including successful or failed audits or security breaches. Other event logs may relate to or include setup events or system events. Still other event logs may include forwarded events, such as events forwarded from other devices associated with the host device 110.

In certain example embodiments, the host device 110 creates the log events when a user 101 logs on to the host device 110, when a program or application on the host device 110 encounters an error, or when the host device 110 detects a threat or intrusion. The host device 110 then transfers the event log to the write file 130 of the trusted computing device 130, and the write file 133 of the trusted computing device 130 receives the event log as a write-file entry.

In certain example embodiments, the trusted device 130 may manage and maintain the system log for the host device 110. That is, the trusted device 130 operates as the event log system for the host device 110. Hence, all event logs that the host device 110 would otherwise manage and maintain, for example, may be transferred to the write file 133 as write-file entries. The write file receives the write-file entries, and the trusted computing device 130 manages and maintains the system log for and on behalf of the host device 110.

In certain example embodiments, the write-file entry may not relate to system log events of the host device 110, but rather requests related to restricted information stored on the trusted computing device 130. For example, the host device 110 may provide a request or command to the write file 133 of the trusted computing device 130 related to the user's financial information, such as a request for a money transfer or withdrawal, as described herein. The write file 133 receives the request as a write-file entry. The trusted computing device 130 then records the received write-file entry as an event log. In other words, in certain example embodiments, the trusted computing device 130 may keep and manage an event log for all events received as a write-file entry, regardless of whether the host device 110 maintains or manages a system log on the host device 110 or relies on the trusted computing device 130 to manage and maintain the system log on behalf of the host device 110.

In block 1010, the trusted computing device determines log data associated with the write-file entry. That is, the trusted computing device 130, such as via the isolated environment processor 135 of the isolated environment, retrieves the write file entry from the write file 133. The isolated processor then determines information associated the write-file entry, such as the date of the event associated with the write file entry, the time of the event associated with the write-file entry, or any other information associated with the write-file entry. For example, if the trusted computing device 130 manages and maintains a system log for the host device 110, the isolated environment processor 135 may determine the time that the write file 133 received the writ-file entry for the access attempt (and hence the time of the access attempt). The isolated environment processor 135 may also determine, such as by reading the content of the write-file entry for the failed access attempt, that the received write file entry relates to a failed access attempt, such as a failed access attempt of an unauthorized user.

In block 1015, the trusted computing device 130 establishes an event log entry based on determined log data. That is, after the trusted computing device 130 determines log data associated with the write-file entry, the isolated environment processor 135 creates an event log entry using the determined log data. For example, if the isolated environment processor 135 determines that the host device 110 entered a failed access attempt event as a write-file entry at 10:53:32 on 01/01/14 into the write file 133, the isolated environment processor 135 creates an event long entry for the 10:53:32 write-file entry of 01/01/14. In certain example embodiments, such as when the isolated environment processor 135 of the trusted computing device 130 determines the content of the write-file entry, the isolated environment processor 135 may also associate a description of the write-file content with the write-file entry. For example, if the write-file entry relates to a failed access attempt on the host device 110, the log event entry description may indicate that the event relates to a failed access attempt at 10:53:32 on 01/01/14.

In certain example embodiments, in addition to establishing the event log entry, the trusted computing device 130 may also process any write-file entry as described herein. That is, if a write-file entry relates to restricted information recorded in the secure storage 136—such as a money transfer or withdrawal request using the user's stored financial account information—the trusted computing device 130 may both process request as described herein, such as in blocks 405 to 430 of FIG. 4, and establish an event log for the request. For example, the host device 110 provides a write-file entry request to transfer money from a financial account of a user 101, the trusted device 130 processes the write-file entry to generate an output for the request as described in blocks 405 to 430 of FIG. 4. But additionally, in certain example embodiments the trusted device 130 may establish an event log entry for the request.

In block 1020, the trusted computing device 130 records the event log entry in the secure storage 136. That is, after establishing the event log entry corresponding to the write-file entry, the isolated environment processor 135 transmits the event log entry to the secure storage 136 of the isolated environment 138. The secure storage 136 receives the event log entry, and records the event log entry in the secure storage 136, such as in an event log file or database of the secure storage. For example, if the event log entry includes a date, time, and/or an event description, the isolated environment processor 135 of the trusted computing device 130 records the date, time, and/or event description information for the event entry corresponding to the write-file entry in the secure storage 136. If the isolated environment processor 135 establishes an event log entry, for example, that includes a date of 01/01/14, a time of 10:53:32, and a description indicating the event relates to a failed access attempt, the recorded event log entry may include a date of 01/01/14 at 10:53:32 and an indication that the event log entry relates to a failed access attempt on the host device 110.

Because the isolated environment processor 135 of the trusted computing device 130 stores the event log entry in the secure storage 136 of the isolated processing environment 138, the host device 110 cannot directly access the event log entry from the secure storage 136. For example, the stored event log entries become restricted information, inasmuch as further access to the event log entries is limited to authorized users. An unauthorized user of the host device 110, for example, cannot access the stored event entry in the secure storage 136, such as to alter, delete, or otherwise tamper with the event log entry. Instead, only an authorized user 101 can access the event log entry as described herein, such as via a secure interface 137 or via the read file 134 of the trusted computing device 130.

In certain example embodiments, the event log entry is an append-only entry. That is, the isolated environment processor 135 of trusted computing device 130 appends the event log entry to the end of other entries in the event log file or database, without altering or deleting any of the preceding event log entries. For example, in append-only embodiments, the isolated processor 135 may record the date, time, and description of an event log entry immediately after a previously recorded event log entry. As an append-only entry, the log entry cannot be modified. In other words, an authorized user 101, or even a host device 110 that the user 101 trusts, cannot change or alter the entry once the processor records the event log entry in the secure storage. In certain example embodiments, the isolated processor 135 records multiple append-only entries, thus resulting in a log file or system event log that is append-only. For example, when a new event log entry is added to the secure storage 136 of the rusted device 130, the entirety of the event logs stored in the secure storage 132—along with the new event entry—are available as described herein as a append-only system event log of log file. Hence, even authorized users 101 of the host device 110, and/or a host device 110 that the user 101 trusts, cannot modify or otherwise edit (other than to append) the logged information stored in the system event log or log file.

In certain example embodiments, the isolated environment processor 135 may assign a unique, sequential log entry number each event log entry. By relying on a sequential log entry number, the ordering of event log entries in the secure storage 136 provides a relative indication of time, as recently appended event log entries are more recent than previous event log entries. That is, a sequential log entry number provides a relative timestamp of the event entry because the time of each entry can measured relative to the times of other event entries. By relying on a sequential log entry number, the trusted device 130 can, in certain example embodiments, create an event log for several event log entries, such as a system event log, that is decoupled from a physical clock.

Figure 11:
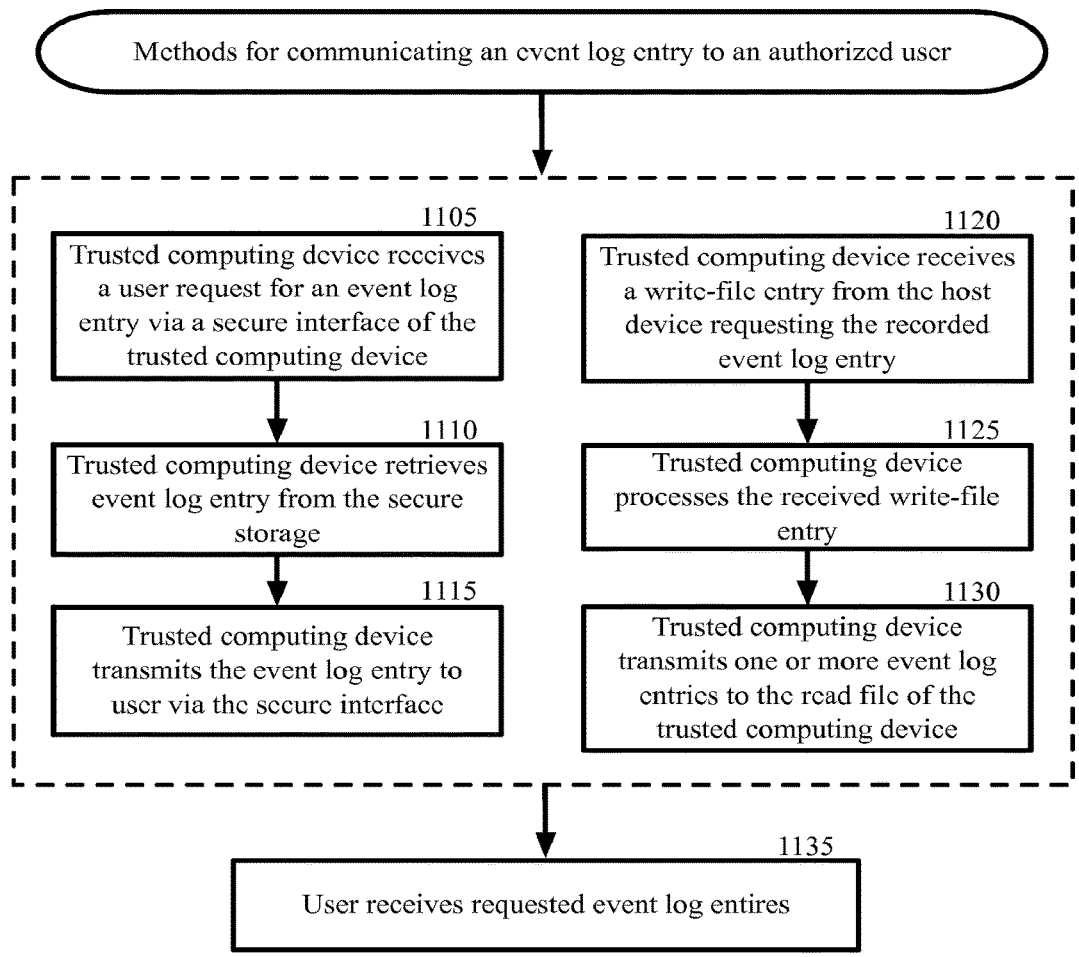
FIG. 11 is a block flow diagram depicting parallel methods for communicating an event log entry to an authorized user, in accordance with certain example embodiments.

FIG. 11 is a block flow diagram depicting parallel methods 1100 for communicating an event log entry to an authorized user 101, in accordance with certain example embodiments. For example, the trusted device 130 communicates one or more event log entries from the secure storage 136 to a user 101 via the secure interface 137, such as described in blocks 1105 to 1115 below. Additionally or alternatively, the trusted device 130 communicates one or more event log entries from the secure storage 136 to a user 101 via a host interface 132, such as described in blocks 1120 to 1130 below. The user 101 then receives the one or more event log entries. For example, the user 101 may receive an entire system log or log file for multiple event log entries.

With reference to FIG. 11, in block 1105 of FIG. 10, the trusted computing device 130 receives a user request for an event log entry via a secure interface 137 of the trusted computing device 130. For example, an authorized user 101 may connect the trusted device 130 to a trusted, second-party computing system 120 that can access isolated environment 138 of the trusted computing device 130 via the secure interface 137. Using the second party computing system 120, for example, the authorized user 101 transmits a request to trusted device 130 via the secure interface 137, such as a request to receive one or more event log entries. For example, the authorized user 101 may request access to an event log entry file or system log containing multiple event log entries. The isolated environment processor 135 receives the request for access via the secure interface 137.

Because the host device 110 is isolated from the secure interface 137 as described herein, the host device 110 is not otherwise aware of, nor can it influence, a request made through the secure interface 137. For example, the host device 110 cannot request a secured event log entry (or other restricted information) via the secure interface 137. An authorized user request via the secure interface 137 thus remains secure from the untrusted host device 110.

In block 1110, the trusted device 130 retrieves the event log entry from the secure storage 136. For example, the isolated environment processor 135 of the trusted computing device 130 reads the received request from the authorized user 101 requesting access to one or more of the event log entries. The isolated environment processor 135 then reads the secure storage 136 for event log entries responsive to the authorized user's request. For example, if the authorized user 101 has requested access to the entire event log file contents, such as a system log or log file, the isolated environment processor 135 identifies the entire event log file or system log and retrieves the entire event log file or system log for transmission to the authorized user 101 as described herein.

In block 1115, the trusted computing device 130 transmits the event log entry to the user via the secure interface 137. That is, after identifying the one or more event log entries responsive to the user request for access to the event log entries, the isolated processor 135 transmits the one or more retrieved event log entries to the authorized user 101 via the secure interface 137 of the trusted computing device. For example, if the authorized user 101 requests an entire log file or system log contents from the trusted device 130, the isolated processor 135 transmits the entire log file or system log to the authorized user 101 via the secure interface 137. The authorized user 101 then receives the one or more event log entries via the secure interface 137 as described further herein.

In certain example embodiments, the trusted device 130 may request a user input to authorize the transmission of the one or more event log entries to the authorized user 101 via the secure interface, such as described herein in blocks 605 to 630 of FIG. 6. For example, the trusted device 130 may transmit a request for authorization to the user 101, such as a blinking light, an audible communication, or other communication, as described herein. The authorized user 101 receives the transmission from the trusted computing device 130, and provides a user input into the trusteed computing device 130 via the secure interface 137 of the trusted computing device 130, as described herein.

In certain example embodiments, the user input may include a security code that the user 101 inputs into the trusted computing device 130, such as by entering the code into the body of the trusted computing device 130 and/or via a wireless connection. For example, the authorized user 101 may transmit an encrypted code from a wireless key fob to the trusted computing device 130 as described herein. The trusted computing device 130 then receives the encrypted code from the key fob, thus authorizing the transmission of the one or more vent log entries to the authorized user 101.

In block 1120, additionally or alternatively to the methods described in blocks 1005 to 1015 of FIG. 10, the trusted computing device 130 receives a write-file entry from the host device 110 requesting the recorded event log entry. For example, the user 101 inputs a request into a user interface of the host device 110 requesting one or more log event entries, such as a log file or system log. The host device 110 then receives the user input requesting one or more log event entries, such as a log file or system log, and transmits the request as a write-file entry via the host interface 132 to a write file 133 of the trusted device 130. The write-file receives the transmission as a write-file entry, such as described herein in block 415 of FIG. 4.

In block 1125, the trusted computing device 130 processes the received write-file entry. That is, the trusted device 130 responds to the request for the one or event log entries received from the write file 133, such as described in blocks 505 to 515 of FIG. 5. For example, based on the received write-file entry request, the trusted computing device 130 determines from the write-file entry that the write-file entry relates to the stored event log entries. The trusted computing device 130 also identifies the one or more event log entries that are responsive to the determined write-file entry. The trusted device 130 then generates an output based on the identified event log entries that is responsive to the write-file entry. For example, the isolated environment processor 135 may generate a copy of append-only event log entries stored in the secure storage 136 as the output. And, in certain example embodiments, the trusted computing device 130 secures the output, such as by encrypting the output for the requested event-log entries, such as described in block 520 of FIG. 5. For example, the isolated environment processor 135 may encrypt the responsive event log entries to generate a secure output that can be communicated via the network 105 to a second host device 110 that can decrypt the encrypted event log entries.

In block 1130, the trusted computing device 130 transmits one or more event log entries to the read file 134 of the trusted computing device 130. That is, the isolated environment processor 135 of the trusted device 130 transfers the one or more requested event log entries (or copies of the event log entries) to the read file 134 of the trusted device 130, such as described in block 425 of FIG. 4. The read file 134 of the trusted device 130 then receives the requested event log entries, thus making the event log entries available to the host device 110 connected to the trusted device 130. In certain example embodiments, such as discussed herein with reference to FIG. 6, the trusted device 130 optionally receives a secure authorization from the user 101 before transmitting the event log entries to the read file 134 of the trusted device 130. For example, a user 101 may provide a user input to the trusted device 130 via a secure interface, thus authorizing processing of the write-file entry and/or transmission of the event log entries to the read file 134 of the trusted device 130.

In block 1135, after the trusted device 130 either transmits the requested event log entries to the authorized user 101 via the secure interface 137 or via the read file 134 of the trusted device 130, the user 101 receives the requested event log entries. For example, the user 101 may receive the event log entries directly via the secure interface 137, such as via a transferred event log file or system log from the trusted computing device 130. Additionally or alternatively, if the trusted computing device 130 transmits the event log entries to the read file 134 of the trusted device 130, the host device 110 receives the event log entries, such as described in block 430 of FIG. 4. The host device 110 then provides the event log entries to the user 101, such as via a user interface associated with the host device 110. The user 101 then receives the event log entries.

In certain example embodiments, the user 101 may optionally verify the authenticity of one or more log events that the user 101 receives via the host interface 132. For example, even though the isolated processor 135 may provide the log event entries to the read file 134 from the append-only log event entries stored in the secure storage 136, a compromised host device 110 may attempt to misrepresent the log event entries received from the read file 134. To detect or identify such misrepresentations, an authorized user 101 can compare one or more event log entries received via the read file 134 of the host interface 132 to one or more event log entries received via the secure interface 137. Because the secure interface 137 is inaccessible to the host device 110, any discrepancies identified based on the comparison provide an indication that the host device 110 is compromised. For example, if one or more log entry events are present on a log file received via the secure interface but are missing from a log file received via the host interface 132, the authorized user 101 may determine that the host device 110 is compromised based on the missing log event entries. Any other deletions, additions, or alterations of the log file received via the host interface 132—as compared to the log file received from the secure interface 137 may similarly provide an indication that the host device 110 is compromised.

In certain example embodiments, the user 101 may remove the trusted device 130 from the host device 110 and insert the trusted device 130 into a second host device 110 that the user 101 trusts. For example, if the user 101 suspects that the first host device 110 may be compromised, the user 101 may remove the trusted computing device 130 from the first host device 110 that has been using the trusted computing device 130 as a system log as describe herein. Hence, the trusted device 130 contains, in the secure storage 136 of the trusted device 130, one or more event log entries for the first host device 110. The user 101 can then access the event log entries of the first host device 110 by requesting—via the second host device 110 and the host interface 132—access to the event log entries, as described herein. For example, the trusted device 130 generates a secure output to the read file 134 of the trusted device 130 that is responsive to the request, and the second host device receives the read-file entry from the read file 134 as described herein.

By securing event log entries in the secure storage 136 of a trusted computing device, the trusted device 130 protects the event log entries from tampering from an unauthorized user 101, such as an attacker. For example, an unauthorized user 101 attempting to maliciously access the host device 110 cannot cover his or her tracks if the event log—which can record access attempts as append-only event log entries—securely stores the access attempt as an event log entry in the secure storage 136. In other words, the unauthorized user cannot access the event log, such as to alter or delete event log data associated with append-only event log entries of the secure storage 136. Instead, only an authorized user 101 can access the event log entries, but cannot alter or change the append-only event log entries. And, by accessing and reading the secure event log, the user 101 can determine if unauthorized attempts to access the host device 110 have occurred. For example, the authorized user 101 can determine, based on reading the requested event log entries, the date and time of the access attempts of the unauthorized user 101. An authorized user 101 can also determine if a host device 110 is compromised, such as comparing log files received from via the host interface 132 with log files received via the secure interface 137.

As those skilled in the art will appreciate based on the disclosure provided herein, the methods, systems, and devices described herein can be used and configured for overlapping and interrelated purposes. For example, a user 101 may configure the trusted computing device 130 to record a secure event log entry for every write-file entry that the write file 133 of a trusted computing device receives, such all write-file entries related to request for restricted information. In such example embodiments, an authorized user 101 by reviewing and/or comparing received event log entries—can determine the types of restricted information the host device 110 has been seeking. In other example embodiments, such as during two-way communications between two host computing devices 110, a user 101 may configure one or both of the trusted computing devices 130a and 130b to keep a secure event log entry for every received communication. An authorized user can then later access the event log entries for the communications as described herein.

Other Example Embodiments

FIG. 12 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A trusted computing device, comprising:
    an isolated environment comprising:
        an isolated environment processor;
        memory comprising a secure partition and a non-secure partition, the memory connected for data communication with the isolated environment processor; and
        an auxiliary processor connected for data communication with the isolated environment processor and the memory;
        wherein the memory and the auxiliary processor communicate with a host only through the isolated environment processor;
    a host interface connected for data communication with the isolated environment processor; and
    a computer program product comprising a non-transitory computer-readable media having computer-executable program instructions embodied thereon that, when executed by the trusted computing device, cause the trusted computing device to:
        present a first file system partition at the host interface via the isolated environment processor, the first file system partition comprising a host write file and a host read file, wherein file creation and file deletion privileges are allocated only to the isolated environment processor;
        present a non-secured second file system partition with access to the memory non-secure partition via the host interface via the isolated environment processor;
        receive, via the host write file, requests to perform trusted computing in the isolated environment, the trusted computing comprising one or more of: random number generation, append-only logging, monotonic counting, streaming encryption and decryption, bulk encryption and decryption, and isolated storage;
        perform the requested trusted computing using at least one of the isolated environment processor, the memory secure partition and the auxiliary processor; and
        write the trusted computing results to the host read-only file.

2. A trusted computing system, comprising:
    a trusted computing device comprising:
        an isolated environment comprising:
            an isolated environment processor; and memory comprising a secure partition and connected for data communication with the isolated environment processor; and
wherein the memory communicates with the host only through the isolated environment processor;
a host interface connected for data communication with the isolated environment processor; and
a computer program product comprising a non-transitory computer-readable media having computer-executable program instructions embodied thereon that when executed by a computer cause the computer to:
present a first file system partition via the host interface from the isolated environment processor, the first file system partition comprising a host write file and a host read-only file;
receive, via the host write file, requests to perform trusted computing in the isolated environment;
perform the requested trusted computing operations using the isolated environment processor and the memory secure partition; and
write the secure operation results to the host read-only file.

3. The trusted computing system of claim 2, wherein:
the memory further comprises a non-secure partition; and
the computer-executable program instructions further comprise computer-executable program instructions to present an unsecured second file system partition with access to the memory non-secure partition via the host interface from the isolated environment processor.

4. The trusted computing system of claim 2, wherein:
the isolated environment further comprises an auxiliary processor connected for data communication with the isolated environment processor and the memory; and
the computer executable program instructions further comprise computer-executable program instructions to perform the requested secure operations using at least one of the isolated environment processor, the memory secure partition, and the auxiliary processor.

5. The trusted computing system of claim 4:
wherein the computer-executable program instructions to receive, via the host write file, requests to perform trusted computing in the isolated environment further comprise computer executable program instructions to receive, via the host write file, requests to perform streaming encryption; and
wherein the computer-executable program instructions further comprise computer-executable program instructions to perform streaming encryption using the auxiliary processor upon receipt of a request to perform streaming encryption.

6. The trusted computing system of claim 2: further comprising at least one secure interface, the secure interface being separate from the host interface and being connected for data communication with the isolated environment processor, and wherein the at least one secure interface associated with computer executable program instructions to provision the computing device for cryptographic operations is a Joint Test Action Group (JTAG) interface.

7. The trusted computing system of claim 2:
further comprising at least one secure interface, the secure interface being separate from the host interface and being connected for data communication with the isolated environment processor,
wherein the trusted computing device further comprises at least one secure interface connected for data communication with the isolated environment processor, and
wherein the computer executable program instructions further comprise computer-executable program instructions to execute a challenge-response authentication protocol via the at least one secure interface as a condition precedent to performing at least one trusted computing activity in the isolated environment.

8. The trusted computing system of claim 7, wherein the secure interface is responsive to a user touch, and the required response of the challenge response protocol is a user touch.

9. The trusted computing system of claim 7, further comprising a user interface device in data communication with the isolated environment via the at least one secure interface, the user interface device being responsive to a user touch, and the required response of the challenge response protocol being a user touch to the remote user interface.

10. The trusted computing system of claim 9, wherein the data communication link between the remote user input device and the at least one secure interface comprises a near field communication (NFC) link.

11. The trusted computing system of claim 2, wherein the memory comprises flash memory.

12. The trusted computing system of claim 11, wherein the trusted computing device is form-compatible and function-compatible with the micro Secure Digital (microSD) nonvolatile memory card standard.

13. The trusted computing system of claim 2, wherein first file system partition is compatible with a File Allocation Table (FAT) computer file system architecture.

14. The trusted computing system of claim 13, wherein all blocks in the first file system partition, except for the blocks used for the read-only file and the write file, are marked as bad.

15. The trusted computing system of claim 2, wherein trusted computing comprises data serialization and data deserialization.

16. A method to perform trusted computing, comprising:
providing a trusted computing device, comprising,
an isolated environment comprising:
an isolated environment processor, and
memory comprising a secure partition and connected for data communication with the isolated environment processor, wherein the memory communicates with the host only through the isolated environment processor;
a host interface connected for data communication with the isolated environment processor; and
a computer program product comprising a non-transitory computer-readable media having computer-executable program instructions embodied thereon that when executed by a computer cause the computer to:
present a first file system partition via the host interface from the isolated environment processor, the first file system partition comprising a host write file and a host read-only file;
receive, via the host write file, requests to perform trusted computing in the isolated environment;
to perform the requested trusted computing operations using the isolated environment processor and the memory secure partition; and
write the secure operation results to the host read-only file.

17. The method of claim 16, wherein:
the memory further comprises a non-secure partition; and
the computer-executable program instructions further comprise computer-executable program instructions to present an unsecured second file system partition with access to the memory non-secure partition via the host interface from the isolated environment processor.

18. The method of claim 16, wherein:

the isolated environment further comprises an auxiliary processor connected for data communication with the isolated environment processor and the memory; and the computer executable program instructions further comprise computer-executable program instructions to perform the requested secure operations using at least one of the isolated environment processor, the memory secure partition, and the auxiliary processor.

19. The method of claim 18, wherein:

wherein the computer-executable program instructions to receive, via the host write file, requests to perform trusted computing in the isolated environment further comprise computer executable program instructions to receive, via the host write file, requests to perform streaming encryption; and wherein the computer-executable program instructions further comprise computer-executable program instructions to perform streaming encryption using the auxiliary processor upon receipt of a request to perform streaming encryption.

20. The method of claim 16, further comprising at least one secure interface, the secure interface being separate from the host interface and being connected for data communication with the isolated environment processor, and wherein the at least one secure interface associated with computer executable program instructions to provision the computing device for cryptographic operations is a Joint Test Action Group (JTAG) interface.

* * * * *